(12) United States Patent
Barkan et al.

(10) Patent No.: US 12,267,582 B2
(45) Date of Patent: Apr. 1, 2025

(54) IMAGING SYSTEMS AND ASSOCIATED METHODS FOR POWER MANAGEMENT

(71) Applicant: ZEBRA TECHNOLOGIES CORPORATION, Lincolnshire, IL (US)

(72) Inventors: Edward Barkan, Miller Place, NY (US); Darran Michael Handshaw, Sound Beach, NY (US); Mark Drzymala, Saint James, NY (US); David P. Goren, Smithtown, NY (US); Binyamin Stein, Flushing, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 119 days.

(21) Appl. No.: 18/204,156

(22) Filed: May 31, 2023

(65) Prior Publication Data

US 2024/0406548 A1   Dec. 5, 2024

(51) Int. Cl.
*H04N 23/65* (2023.01)
*H04N 23/56* (2023.01)
*H04N 23/611* (2023.01)
*H04N 23/667* (2023.01)

(52) U.S. Cl.
CPC .......... *H04N 23/651* (2023.01); *H04N 23/56* (2023.01); *H04N 23/611* (2023.01); *H04N 23/667* (2023.01)

(58) Field of Classification Search
CPC .... H04N 23/651; H04N 23/56; H04N 23/611; H04N 23/667
See application file for complete search history.

(56) References Cited

U.S. PATENT DOCUMENTS

| | | | |
|---|---|---|---|
| 2020/0068102 A1* | 2/2020 | Tilleman | H04N 23/56 |
| 2021/0004972 A1* | 1/2021 | Wang | G06T 7/97 |
| 2021/0084280 A1* | 3/2021 | Zhang | G06V 10/10 |
| 2022/0129066 A1* | 4/2022 | Zahnert | G06F 3/012 |
| 2022/0303451 A1* | 9/2022 | Poloniewicz | G06K 7/10722 |

* cited by examiner

*Primary Examiner* — Padma Haliyur
(74) *Attorney, Agent, or Firm* — Yuri Astvatsaturov

(57) ABSTRACT

A system is disclosed that includes an image sensor, a depth sensor, and at least one processor. The image sensor acquires images within a first field-of-view. The depth sensor includes a plurality of photosensitive cells that acquires distance information within a second field-of-view. The second field-of-view at least partially overlaps the first field-of-view. The at least one processor is programmed to transition from a first mode of operation to a second mode of operation in response to satisfaction of a specified criteria based on object information associated with the distance information for an object within the second field-of-view.

33 Claims, 12 Drawing Sheets

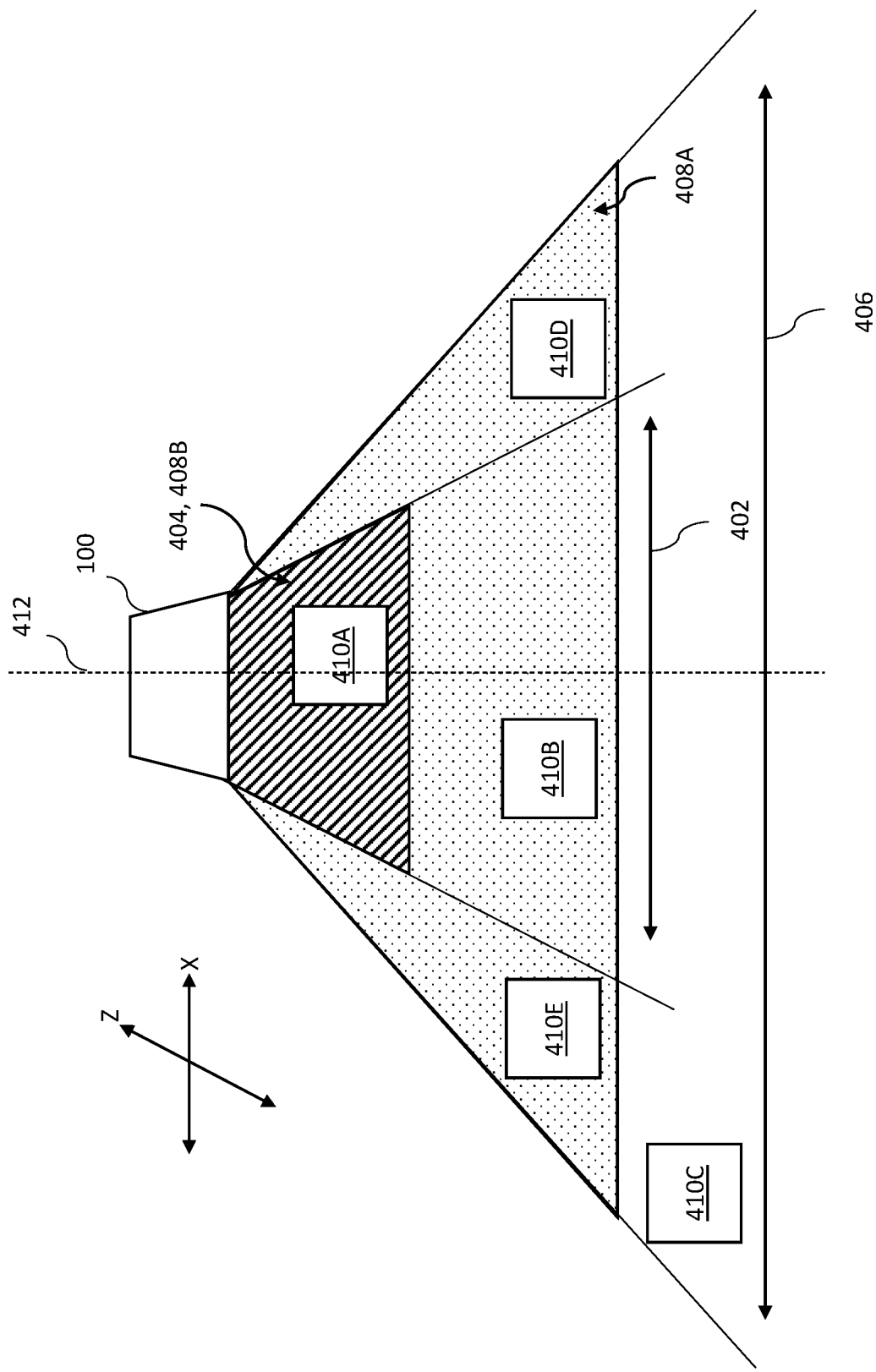

IMAGING SYSTEMS AND ASSOCIATED METHODS FOR POWER MANAGEMENT

BACKGROUND

Management of operation modes of imaging systems can aid in the operation and use of the imaging systems and/or can aid in efficient conservation and use of power. As an example, imaging systems can operate in different power consumption modes. These different power consumption modes can cause the imaging systems to consume different amounts of power and can cause certain components, operations, and/or functions of the imaging system to be deactivated. In a low power mode of operation or sleep mode, imaging systems can, for example, consume a low amount of power as compared to other power modes of operation of the imaging system. It is therefore advantageous for the imaging system to operate in the sleep mode when it is not in use to conserve power.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4A-E are schematic views illustrating examples of field-of-views of an image sensor and a depth sensor in accordance with embodiments of the present disclosure.

Figure 1:
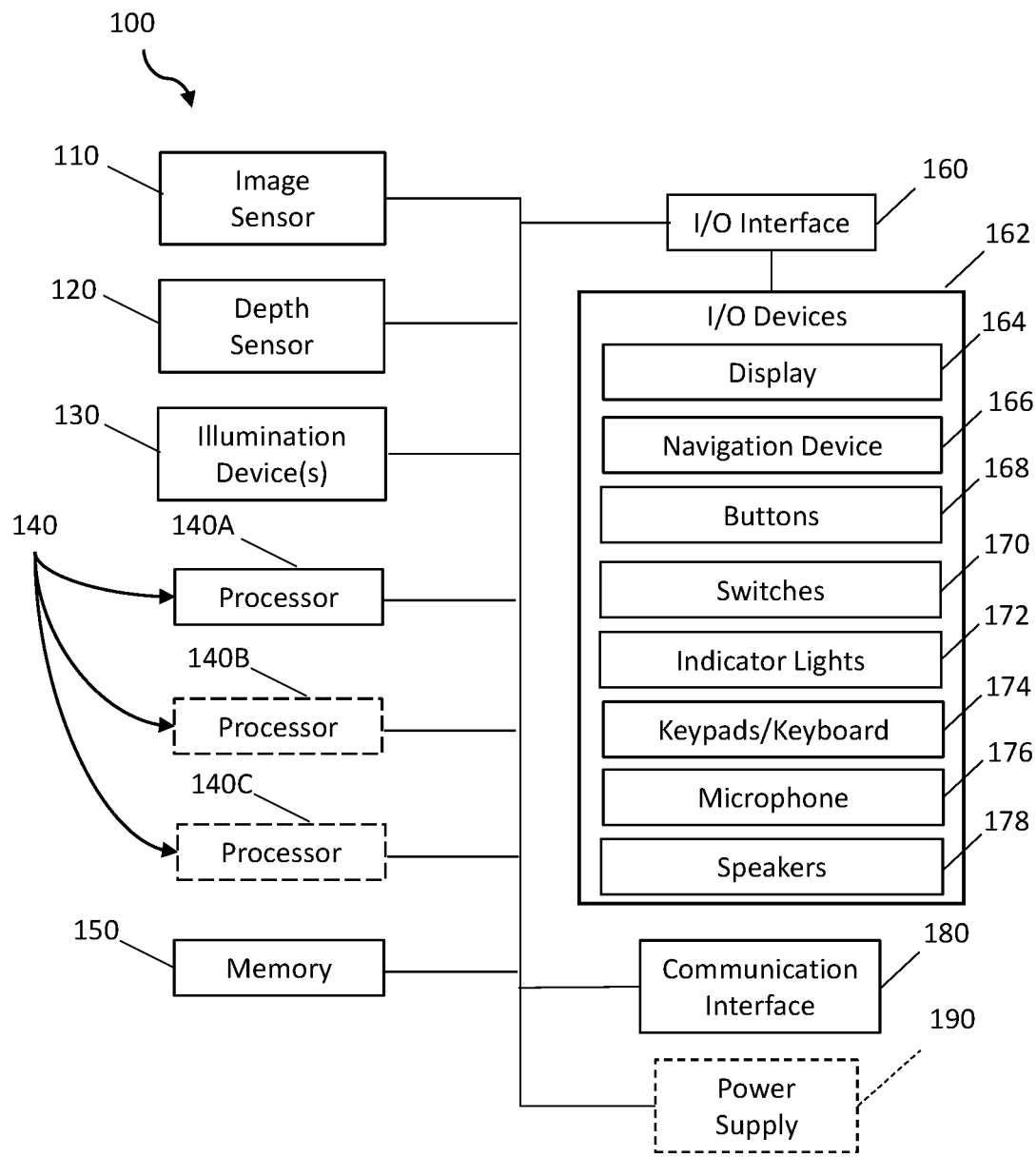
FIG. 1 is a block diagram that illustrates components of an example imaging system in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Embodiments of the present disclosure include an image sensor, a depth sensor, and at least one processor, where the field-of-view of the depth sensor at least partially overlaps the field-of-view of the image sensor. The processor is programmed to transition between different modes of operation or activation states based on distance information output by an array of photosensitive cells in the depth sensor.

In accordance with embodiments of the present disclosure, imaging systems, methods, and non-transitory computer-readable storage devices or memory are disclosed. Embodiments of the systems can include the non-transitory computer-readable storage device or memory and/or one or more processors. Embodiments of the non-transitory computer-readable storage device or memory stores instructions that are executable by the one or more processors, where execution of the instructions by the processors cause the processor to perform aspects of the methods.

In accordance with embodiments of the present disclosure, a method is disclosed that includes operating an imaging system in a first mode of operation. At least one of the components of the imaging system can be deactivated in the first mode of operation. The imaging system can consume a first amount of power in the first mode of operation or activation state. The imaging system includes an image sensor having a first field-of-view and a depth sensor having a second field-of-view that at least partially overlaps, is co-extensive with, and/or is greater than the first field-of-view. The method also includes detecting an object within the second field-of-view via the depth sensor of the imaging system. The depth sensor includes an array of photosensitive cells that acquires distance information for the object in the second field-of-view. The method further includes determining, via a processor of the imaging system, object information associated with the object based on the distance information output of the depth sensor. The object information includes, for example, depth and position information of the object in three-dimensional space relative to a reference location. The method further includes determining whether the object information associated with the object satisfies a first criteria and transitioning the imaging system from the first mode of operation to a second mode of operation or activation state in response to the object information satisfying the first criteria, where the at least one component that is deactivated in the first mode of operation or activation state and is activated in the second mode of operation or activation state.

In accordance with embodiments of the present disclosure, a system is disclosed. The system includes an image sensor, an illumination device, a depth sensor, and at least one processor. The image sensor can acquire images within a first field-of-view. The illumination device is configured to illuminate the first field-of-view at least one or before or during image acquisition by the image sensor. The depth sensor includes a plurality of photosensitive cells to acquire distance information within a second field-of-view, wherein the second field-of-view at least partially overlaps the first field-of-view. The at least one processor is programmed to control an operation of the at least one processor, the image sensor, the illumination device and/or the depth sensor based on a plurality of modes of operation or activation states. The plurality of modes of operation or activation states include the first mode of operation or activation state and the second mode of operation or activation state. The at least one processor is programmed to transition from the first mode of operation or activation state to the second mode of operation or activation state in response to satisfaction of the first criteria based on object information associated with the distance information output by the depth sensor for an object within the second field-of-view. The object information includes depth and position information of the object in three-dimensional space relative to a reference location. At least one of image acquisition by the image sensor or illumination by the illumination device is deactivated in the first mode of operation and is activated in the second mode of operation or activation state. For example, at least one of the image sensor or the illumination device is deactivated in the first mode of operation or activation state and is activated in the second mode of operation or activation state. The second mode of operation or activation state can consume more power than the first mode of operation or activation state.

In accordance with embodiments of the present disclosure, the system includes at least one of an input/output (I/O) interface or a communication interface. A signal is transmitted, via the at least one of the I/O interface or the communication interface, from the at least one processor of the imaging system to a device operatively coupled to the imaging system in response to the imaging system transitioning from the first mode of operation to the second mode of operation to cause the device to at least one of transition from a first device mode of operation to a second device mode of operation or control a video system to acquire and transmit video to the device or a different device.

In accordance with embodiments of the present disclosure, the second field-of-view extends beyond the first field-of-view one two or more sides of the first field-of-view, and the at least one processor of the imaging system transitions from the first mode of operation to the second mode of operation after the object enters the second field-of-view and before the object enters the first field-of-view.

In accordance with embodiments of the present disclosure, the at least one processor or a different processor performs a process of repeatedly detecting the object via the depth sensor to acquire updated distance information associated with the object; determining updated object information associated with the object based on the updated distance information output of the depth sensor; determining whether the updated object information associated with the object satisfies a specified second criteria; and transitioning the imaging system from the second mode of operation to a third mode of operation in response to the updated object information satisfying the second criteria.

In accordance with embodiments, the first mode of operation can be a low power mode of operation, the second mode of operation can be at least one of an intermediate power mode of operation or a high power mode of operation of the imaging system. When the second mode of operation is the intermediate power mode of operation, the third mode of operation can be a high power mode of operation. The high-power mode of operation can consume more power than the intermediate power mode of operation and the low power mode of operation.

In accordance with embodiments of the present disclosure, the imaging system includes at least one illumination device associated with the image sensor and a second processor configured to process images acquired by the image sensor, and at least one of the image sensor, the at least one illumination device, or the second processor is the at least one component is deactivated in the first mode of operation.

In accordance with embodiments of the present disclosure, detecting and decoding encoded indicia in images of the object acquired by the image sensor is activated in the second mode of operation and at least one of acquiring images, detecting encoded indicia in the images, or decoding the encoded indicia is deactivated in the first mode of operation.

In accordance with embodiments of the present disclosure a scan zone can be defined within the first field-of-view the image sensor, the first criteria corresponds to detecting the object positioned in a first activation zone adjacent to the scan zone, and the second criteria corresponds to the object or a different object positioned in a second activation zone that at least partially overlaps the scan zone. The first activation zone and the second activation zone are defined within the second field-of-view of the depth sensor.

In accordance with embodiments of the present disclosure, determining the object information includes discriminating between animate and inanimate objects, where the object is an animate object and the different object is an inanimate object, and the processor or a different processor is prevented from decoding encoded indicia in images captured of the object by the image sensor when the object is positioned outside of the second activation zone.

In accordance with embodiments of the present disclosure, a signal is transmitted from the imaging system, by the processor or a different processor, to a device in response to transitioning to the second mode of operation or a third mode of operation to cause the device to at least one of transition from a first device mode of operation to a second device mode of operation or control a video system to acquire and transmit video to the device or a different device.

In accordance with embodiments of the present disclosure, the object detected by the depth sensor is a human and the object information includes features of the human. The processor or a different processor determines a movement of the human through the second field-of-view and whether the human is transporting at least one of a bag, cart, or basket; determines whether the movement of the human with the at least one of the bag, cart, or basket corresponds to an anomaly; and transmits an alert from the imaging system to a device in response to determining the movement corresponds to an anomaly.

In accordance with embodiments of the present disclosure, the object detected by the depth sensor is determined to be a human. The object information can include facial features of the human and the processor or a different processor can transmit the facial features to a device to cause the device to allow or deny access to an account based on a comparison of the facial features to stored facial features. Alternatively, or in addition, the object information can indicate that at least part of the human has entered an activation zone, and the first specified criteria is satisfied in response to determining the human has entered the activation zone.

In accordance with embodiments of the present disclosure, the array of photosensitive cells of the depth sensor is segmented into a plurality of zones. The at least one processor or a different processor of the imaging system can track a movement of the object through plurality of zones and acquire the distance information for the object based on the movement of the object through the plurality of zones. A determination of whether the object information satisfies the first criteria includes determining whether a direction of the movement of the object through the plurality of zones corresponds to a specified direction of movement in the first criteria.

In accordance with embodiments of the present disclosure, the array of photosensitive cells of the depth sensor is segmented into a plurality of zones and the imaging system is configured to control one or more components of the imaging system differently based on within which of the plurality of zones the object is detected.

In accordance with embodiments of the present disclosure, an input can be received from a user to configure the imaging system to control one or more components of the imaging system differently based on within which of the plurality of zones the object is detected.

In accordance with embodiments of the present disclosure, the object is detected in one or more of the plurality of zones and the one or more components of the imaging system can be controlled based on the one or more of the plurality of zones within which the object is detected and satisfaction of the threshold for the at least one of the one or more of the plurality of zones. The depth sensor tracks a movement of the object through the plurality of zones and different ones of the one or more components can be activated and/or deactivated or controlled as the object moves through the plurality of zones.

Embodiments of the present disclosure can be embodied as indicia reading systems or barcode scanners that are configured to acquire images of objects via the image sensor. Encoded indicia (such as 1D barcodes, 2D barcodes, stacked barcodes, etc.) can be detected and decoded by the indicia reading system and the information can be extracted based on decoding the encoded indicia. The information can be used by the indicia reading system and/or transmitted to another device or system for further processing (e.g., to retrieve stored information) based on the extracted information. Different types of wakeup systems have been proposed for indicia reading system including, for example, a scene detect wake up system, an object brightness differential wake up system, and an infrared (IR) wake up system. Scene detect wake up systems typically compare image frames acquired by the image sensor to detect changes in pixels between the image frames. After a threshold number of pixels change, the scene detect wake up system can operate to transition the indicia reader from the sleep mode to a full power mode of operation. Scene detect wake systems can cause a system to wake up upon detection of large objects and people moving far away from a scanning area of the indicia reader system resulting in false positive detections that cause a system to enter a mode of operation that has a higher power consumption for no reason. Object brightness differential wake up systems also use the image sensor of the indicia reading system and can require that illumination be pulsed on and off, which can be visible, distracting, and annoying, particularly when the illumination device(s) are not recessed in the indicia reader system or when the scanner is on a reflective countertop. IR wake systems can periodically emit IR radiation and wait for an object to reflect the emitted radiation, which can be detected an IR receiver. IR wakeup system typical require a trade-off in the sensitivity of the IR sensor such that the indicia reader system wakes up upon detection of small objects and does not accidentally wake up when people or other large objects moving in the background.

Embodiments of the present disclosure advantageously provide a system that accurately detects and determines positions, depths, sizes, movement, and/or other information about objects that can be used to determine whether to transition between different modes of operation to provide for management of the operation modes which mitigates or eliminates issues related to sensor sensitivity and/or distracting or annoying pulses of illumination.

FIG. 1 is a block diagram that illustrates an example imaging system 100 in accordance with embodiments of the present disclosure. The imaging system 100 can be embodied as an indicia reading system that can have a variety of configurations including self-contained or integrated configurations in which an operation and function of the imaging system is performed by a single apparatus or device and distributed configurations in which the operation and function of the imaging system 100 is controlled and/or performed in a distributed manner across multiple apparatuses or devices.

The imaging system 100 or portions thereof can be embodied in various form factors including, but not limited to, handheld or mobile form factors with or without a base or dock, wearable form factors, fixed or stationary form factors, semi-stationary form factors, and/or any other suitable form factors. Some examples of the imaging system 100 embodied as an indicia reading system can include, but are not limited to, a handheld "gun" style indicia reader that can be held and aimed by a user and/or can rest upon a surface or on a base or dock to be semi-stationary, a mobile indicia reader having a variety of shapes that can be held and aimed by a user and/or can rest upon a surface or on a base or dock to be semi-stationary, a generally fixed or stationary vertical slot scanner having a generally upright window with a fixed field-of-view, a generally fixed or stationary horizontal slot scanner having a generally horizontal window with a fixed field-of-view, a fixed or stationary bioptical workstation having both a generally horizontal window and a generally upright window with fixed fields of view, and/or any suitable form factors and configurations.

Embodiments of the imaging system 100 can include an image sensor 110, a depth camera or sensor 120, illumination devices 130, one or more processors 140, memory 150, Input/Output (I/O) interfaces 160, and/or a communication interface 180. The imaging system 100 can be powered by a power supply 190, which may or may not form part of the imaging system 100. For example, in some embodiments, the imaging system 100 the power supply 190 can be an external power source, such power form power outlet, and/or an internal power source, such as a battery.

The image sensor 110 can include an array of photosensitive cells or pixels defining an image frame. Some examples of the image sensor 110 can include a charge coupled device (CCD) array, a complementary metal-oxide semiconductor (CMOS) array, and/or another imaging sensor 110. Common components associated with acquiring, reading out, and processing the charge collected by the image sensor 110, including for example, shift registers, amplifiers, timing/clock generators, analog-to-digital converters, digital-to-analog converters, and/or other components can also be denoted by the image sensor 110. The image sensor 110 captures images of an environment through an optical focal device (such as a lens), and/or a window of the imaging system 100, where formation of an image on the photosensitive cells of the image sensor 110 in the image fame corresponds to reflections of light (e.g., in the visible light spectrum) scattered from objects in the environment that impinge upon the photosensitive cells, e.g., through the window and/or the optical focal device. The images acquired by the image senor 110 can be two-dimensional (2D) images that are devoid of depth information. The imaging sensor 110 can be controlled to continuously capture images, capture a burst, batch, or series of images in response to an activation event, and/or capture a single image in response to an activation event. For embodiments of the imaging system 100 that are implemented as indicia reading systems, the images acquired by the image sensor 110 can be processed to detect and decode encoded indicia, such linear or 1D barcodes, matrix codes or 2D barcodes, a combination of 1D and 2D barcodes (or stacked barcode), and/or any other symbologies.

The depth sensor 120 can have an imaging/ranging FOV and can output distance information of objects (e.g., such as multi-point distance information corresponding to depths of the object at different points on the object) in the imaging/ranging FOV of the depth sensor 120. The depth sensor 120 can be positioned relative to the image sensor 110 such that the imaging/ranging FOV of the depth sensor 120 can overlap with and/or encompass the imaging FOV of the image sensor 110. As an example, the imaging/ranging FOV of the depth sensor 120 can at least partially overlap, be coextensive with, and/or can be greater than the imaging FOV of the image sensor 110. The depth sensor 120 can be implemented as, for example, a point cloud depth sensor, a direct or indirect Time-of-Flight (ToF) sensor, a multiple parallax depth sensor, stereo depth sensor and/or depth camera.

The depth sensor 120 can be an array-based depth sensor that has an array photosensitive cells. Some examples of the depth sensor 120 can include a charge coupled device (CCD) array, a complementary metal-oxide semiconductor (CMOS) array, a single photon avalanche diode (SPAD) array, a photodiode array, and/or other photosensitive arrays. The depth sensor 120 acquires distance information of an environment through an optical focal device (such as a lens), and/or a window of the imaging system 100. The photosensitive array can be sensitive to electromagnetic radiation having wavelengths in the non-visible light spectrum (e.g., ultraviolet, near infrared, and/or infrared). For example, the photosensitive array of the depth sensor 120 can include a light filter that attenuates electromagnetic radiation outside of a specified wavelength range (e.g., outside of the ultraviolet, near infrared, and/or infrared spectrum) while allowing electromagnetic radiation within the specified wavelength range (e.g., within the ultraviolet, near infrared, and/or infrared spectrum) to pass through the light filter to the photosensitive array. Common components associated with the acquiring, reading out, and processing of the charge collected by the depth sensor 120, including for example, shift registers, amplifiers, timing/clock generators, analog-to-digital converters, digital-to-analog converters, lenses, electronic shutters, and/or other components can also be denoted by the depth sensor 120.

The depth sensor 120 can also implement multi-zone or multi-region ranging and/or imaging. As an example, the imaging/ranging FOV of the depth sensor 120 can be segmented into different zones where each zone can be operable to detect and determine distances to objects in the respective zones. The distance information can be used to determine information about objects (object information) within the imaging/ranging FOV of the depth sensor 120, such as positions of the objects in three-dimensional space, distances of the objects relative to a reference location, characteristics of the objects (e.g., size and/or shape), a direction of movement of the objects, three-dimensional images that include depth information, and/or can be used to recognize the objects and/or discriminate between different objects. The imaging/ranging FOV of the depth sensor 120 can be overlayed onto image frames acquired by the image senor 110 or associated with the image frames acquired by the image sensor 110.

The illumination devices 130 can emit diffuse and/or direct light over an illumination field. The light emitted by the illumination devices 130 can be emitted at one or more wavelengths and/or intensities in the light spectrum, including, for example, the visible light spectrum, the near-infrared light spectrum, the infrared light spectrum, and/or the ultraviolet light spectrum. The illumination devices 130 can be continuous light sources, intermittent light sources, or a signal-controlled light sources, such as a light source triggered by a user interface, an event, an action, and the like. The illumination devices 130 can include, for example, light emitting diodes (LEDs) and/or laser diodes that can be controlled (via LED drivers and/or laser diode drivers, respectively, which can also be denoted by 130 in FIG. 1) in response to control signals from the one or more processors 140. The illumination devices 130 can be energized to emit light before and/or during image acquisition by the image sensor 110 and/or before and/or during acquisition of the distance information by the depth sensor 120. As an example, at least one of the illumination device 130 can emit visible light before and/or during image acquisition by the image sensor 110 and at least one of the illumination devices can emit non-visible light (e.g., infrared light) before and/or during distance acquisition by the depth sensor 120. Additionally, the illumination devices 130 can include optics for dispersing, focusing, spreading, and/or filtering the light emitted from the illumination devices 130.

The one or more processors 140 include, for example, one or more microprocessors, central processing units (CPUs), graphics processing units (GPUs), microcontrollers, controllers, and/or any suitable types of logic circuits. Additional and/or alternative example logic circuits, such as field programmable gate arrays (FPGAs) and application specific integrated circuits (ASICs) capable of, for example, implementing operations of the one or more processors 140 can be employed instead of or in addition to the one or more processors 140. The one or more processors 140 can have a single core or multiple cores and can implement serial and/or parallel processing. As an example, the one or more processors 140 can include a processor 140A, a processor 140B, and/or a processor 140C, where the processor 140A can be programmed to control an overall operation of the imaging system 100, the processor 140B can be a processor programmed to control an operation of the image sensor 110, e.g., in response to instructions or signals received from the processor 140A, and/or the processor 140C can be a processor programmed to control an operation of the depth sensor 120, e.g., in response to instructions or signals received from the processor 140A. Alternatively, the processor 140A can control an operation of the image sensor 110 and/or the depth sensor 120 instead of or in the absence of the processors 140B and/or 140C, respectively.

The one or more processors 140 control the image sensor 110 to capture images of the portion of the environment within an imaging FOV of the image sensor 110 and control the depth sensor 120 to capture distance information associated with objects in the environment within an imaging/ranging FOV of the depth sensor 120. The one or more processors 140 (e.g., processor 140A and/or processor 140C) can use the acquired distance information associated with objects in the environment to detect and/or determine object information associated with the objects for which distance information is acquired. The object information can include, for example, positions and/or orientations of the objects in three-dimensional space, distances and/or locations of the objects relative to a reference location in three dimensional space, one or more characteristics of the objects (e.g., size and/or shape), a direction of movement of the object, and/or can be used to recognize the objects and/or discriminate between the between the objects. The reference location can be, for example, a location of the depth sensor 120, a specified scan zone associated with the image sensor 120, a window of the imaging system 100, and/or other reference locations.

The one or more processors 140 can perform one or more operations based on the detected and/or determined object information. As an example, the one or more processors 140 can process the object information to determine whether to transition from one mode of operation or activation state to one or more other modes of operation or activation states and/or whether to output a signal (e.g., wake, sleep, or interrupt signal) to one or more other devices or systems to cause the other devices or systems to transition from one mode of operation or activation state to another mode of operation or activation state. For embodiments in which the depth sensor 120 captures three-dimensional (3D) images, one or more image processing and/or recognition techniques and/or algorithms can be employed by the one or more processors 140 to detect and determine the object information based on the distance information output by the depth sensor 120.

The imaging system 100 includes any number or types of non-transitory computer- or machine-readable storage devices or memory 150 (e.g., volatile memory, non-volatile memory, etc.) accessible by the one or more processors 140. The one or more processors 140 interact with the memory 150 to obtain, for example, computer- or machine-readable instructions or code stored in the memory 150. Additionally or alternatively, computer- or machine-readable instructions corresponding to the example operations described herein may be stored on one or more removable media (e.g., a magnetic storage drive, an optical storage drive, solid state drive, a compact disc (CD), a digital versatile disk (DVD), a removable flash memory, etc.) that may be operatively coupled to the one or more processors 140 to provide access to the computer- or machine-readable instructions stored thereon. The memory 150 can also store images acquired by the image sensor 110, image data associated with the images acquired by the image sensor 110, distance information acquired by the depth sensor 120, object information derived from the distance information; and/or any other information or data.

The one or more processors 140 can execute the computer- or machine-readable instructions or code stored in the memory 150 to implement, for example, embodiments of the present disclosure via one or more operations, processes, routines, and/or functions. As an example, the one or more processors 140 can execute the instructions or code stored in memory to control an operation of the image senor 110 and the depth sensor 120, determine object information from distance information acquired by the depth sensor 120, determine whether to transition from one mode of operation to one or more other modes of operation based on the object information, determine whether to output a signal (e.g., wake/sleep/interrupt) to one or more other devices or system to cause the devices or systems to transition from one mode of operation to another mode of operation, and/or can control the imagining system 100 to perform other operations or actions, such as anomaly detection based on the output of the depth sensor 120 and/or the image sensor 110. As one example, the distance information acquired by the depth sensor 120 and/or object information can be used by the one or more processors 140 to determine whether to transition the imaging system 100 or one or more other devices or systems communicatively coupled to the imaging system from a low power mode of operation to an intermediate power mode of operation or to a high power mode of operation. As another example, the distance information acquired by the depth sensor 120 and/or object information can be used by the one or more processors 140 to determine whether to transition the imaging system 100 and/or to cause one or more other devices or systems from the intermediate power mode of operation to the high power mode of operation. As another example, the distance information and/or object information can be used by the one or more processors 140 to determine whether the imaging system 100 and/or one or more other devices or systems should remain in the intermediate power mode of operation or to transition to the low power mode of operation or the high power mode of operation. As another example, the distance information and/or object information can be used by the one or more processors 140 to determine whether the imaging system 100 and/or one or more other devices or systems should remain in the high power mode of operation or to transition to the low power mode of operation or the intermediate power mode of operation. As another example, the distance information and/or object information can be used by the one or more processors 140 to determine whether to transition between the modes of operation to activate/deactivate one or more operations and/or modules, such image acquisition via the image sensor, illumination via the illumination devices 130, decoding of images via one of the one or more processors, and/or other operations and/or modules. As another example, the distance information and/or object information can be used by the one or more processors 140 to determine whether an anomaly has occurred with respect to objects. Activation of a component can include, for example, energizing, enabling, and/or activating the component such that the component is capable of and/or controlled to perform operations or functions associated with the component and deactivation of a component can include, for example, de-energizing, disabling, and/or deactivating the component such that the component is incapable of and/or not controlled to perform operations or functions associated with the component.

The I/O interface 160 can include any number and/or type(s) of different types of I/O circuits, components, and/or interfaces to enable receipt of user input from I/O devices 162, communicate output data via the I/O devices 162, and/or communicate with other devices (e.g., a base, a dock, a POS system, a server, a computing system, etc.). The I/O devices 162 can include a display 164 (including, e.g., touch screen displays), a navigation device 166 (e.g., a mouse, a trackball, a capacitive touch pad, a joystick, etc.) buttons 168, switches 170, indicator lights 172, keypads/keyboard 174, a microphone 176, speakers 178, and/or other devices (e.g., a base, a dock, a POS system, a server, a computing system, etc.). The I/O interface 160 can receive input from a user or another device and/or can output information or data to a user or another device. As an example, a user or other device can actuate, manipulate, and/or control the display 164, the navigation device 166, buttons 168, switches 170, indicator lights 172, keypads/keyboard 174, microphone 176, and/or speakers 178 and the one or more processors 140 can execute one or more instructions or code in response to the input. As another example, the display 164, indicator lights 162, and/or speakers 168 can be actuated or controlled by the one or more processors 140 to output data or information in response to operations performed by the one or more processors 140, e.g., based on execution of the computer- or machine-readable instructions and/or the input from the user or another device. The I/O interface 130 can be integrated with the one or more processors 140.

The imaging system 100 can also include any number and/or type(s) wired and/or wireless communication or network interface(s) 180 that communicatively couple the one or more processors 140 to one or more other devices, such as any one or more of the I/O device 162, a base, a dock, a point-of-sale (POS) station, a server, a computing system, a network device (e.g., router, hub, switch), a cellular base station, etc. The communication interface(s) 180 can facilitate direct communication with the other devices and/or can facilitate indirect communication with the other devices via a network. The communication interface(s) 180 can operate in accordance with any suitable interface(s), protocol(s), signal(s), connector(s), etc. like, for example, a TCP/IP interface, a Wi-Fi™ interface (according to the IEEE 802.11 family of standards), cellular interface (e.g., using GSM, GPRS, CDMA, GPRS, 2G/GSM, 3G, 4G/LTE, EDGE, 5G), a Ethernet transceiver, a universal serial bus (USB) interface, a Bluetooth® interface, a near field communication (NFC) interface, an infrared transceiver, a satellite network radio, a cable modem, a digital subscriber line (DSL) modem, a dialup modem, or any other suitable communication protocols or standards.

In an example operation, embodiments of the imaging system 100 can have different operating modes, the profiles and/or parameters of which can be stored in the memory 150. The one or more processors 140 can execute the instructions or code in the memory 150 based on the operating mode profiles and/or parameters and in response to object information generated based on an output of the depth sensor 120 to activate/deactivate one or more components to transition one or more components of the imaging system 100 between different modes of operation and/or to cause the imaging system to output signals (e.g., wake, sleep, or interrupt signals) to one or more other devices or systems to cause the other devices or systems to activate/deactivate one or more components of the other devices or systems to transition the one or more components of the other devices or systems between different modes of operation. As one example, the imaging system 100 can have a sleep mode or low power mode of operation, an intermediate mode or intermediate power mode operation, a wake mode or a high power mode of operation, and/or other modes of operation, such as an illumination on/off mode, an image acquisition on/off mode, and/or an image decode on/off mode.

In the wake or high power mode of operation, the imaging system 100 can be fully functional and can consume more power (e.g., peak and/or average power) than the low and intermediate power modes of operation. The imaging system 100 can transition to the high power mode of operation from the low power mode of operation and/or from the intermediate power mode of operation. In the high power mode of operation, for embodiments in which the one or more processors 140 includes the processors 140A-C, the processors 140A-C can be activated (e.g., in a wake mode). As another example, the image sensor 110, the depth sensor 120, the illumination devices 130, the I/O interface 160, the one or more of the I/O devices 162, and/or the communication interface 180 can be activated. For example, the image sensor 110 can be enabled to acquire images of an object within the imaging FOV of the image sensor 110 and the depth sensor 120 can be enabled to acquire distance information for objects within the imaging/ranging FOV of the depth sensor 120. For embodiments in which the imaging system 100 is employed as an indicia reading system, encoded indicia can be included on the object that is imaged by the image sensor 110. The encoded indicia can be any set of glyphs that are encoded information or data according to, for example, a defined symbology, mapping, and/or encoding/decoding scheme. Non-limiting examples of encoded indicia can include, for example, linear or 1D barcodes, matrix codes or 2D barcodes, a combination of 1D and 2D barcodes (or stacked barcode), and/or any other symbologies. The one or more processors 140 can execute instructions or code to detect and decode the encoded indicia to extract information from the encoded indicia. The information extracted from the encoded indicia by the one or more processors 140 can be associated with the object and the one or more processors 140 can perform one or more operations using the extracted information. As an example, the one or more processors 140 can retrieve additional information associated with the object from the memory 150 using the extracted information and/or can transmit the extracted information to another device (e.g., a client computing device, server, a point-of-sale system, etc.) and the other device can use the extracted information to perform one or more operations. As an example, the other device can be a point-of-sale system and the point-of-sale system can use the extracted information to retrieve price information for the object associated with the encoded indicia.

In the sleep or low power mode of operation, the imaging system 100 can consume an amount of power (e.g., peak and/or average power) that is lower than the high and intermediate power modes of operation by deactivating one or more components of the imaging system 100. The imaging system 100 can transition to the low power mode of operation from the high power mode of operation and/or from the intermediate power mode of operation. In the low power mode of operation, the depth sensor 120 can be activated to acquire distance information for objects within the imaging/ranging FOV of the depth sensor 120 and at least one of the one or more processors 140 can be activated to generate object information based on the distance information and/or to determine whether the object information satisfies one or more criterion. As an example, for embodiments in which the one or more processors 140 includes the processors 140A-C, the processor 140C can be activated (e.g., in a wake mode), while the processors 140A and 140B can be deactivated (e.g., in a sleep mode). The imaging sensor 110, at least some of the illumination devices 130 (e.g., the illumination devices associated with the image sensor 110, the I/O interface 160, the one or more of the I/O devices 162, and/or the communication interface 180 can be deactivated in the low power mode of operation. When the imaging system 100 is in the low power mode of operation, the imaging system 100 can be incapable of acquiring images with the image sensor 110, detecting encoded indicia captured in the images, and/or decoding encoded indicia detected in the images and/or can be incapable of communicating with other devices or systems.

In the intermediate mode or intermediate power mode of operation, the imaging system 100 can consume an intermediate amount of power (e.g., peak and/or average power) that is greater than the power consumed in the low power mode of operation but less than the power consumed in the high power mode of operation. The imaging system 100 can transition to the intermediate power mode of operation from the low power mode of operation and/or from the high power mode of operation. In the intermediate power mode of operation, the imaging system 100 can activated at least some of the components that are deactivated in the low power mode of operation, while the other components that are deactivated in the low power mode of operation can remain deactivated in the intermediate power mode of operation. Alternatively or in addition, in the intermediate power mode of operation, the imaging system 100 can deactivate at least some of the components that are activated in the high power mode of operation, while the other components that are activated in the high power mode of operation can remain activated in the intermediate power mode of operation. As an example, in some embodiments, the image sensor 110 and/or the illumination devices that are associated with the image sensor 110 can be activated in the intermediate power mode of operation in anticipation of acquiring images of an object within the imaging FOV of the image sensor (e.g., an object detected within the imaging FOV of the image sensor 110 and/or the imaging/ranging FOV of the depth sensor 120 or an object is detected outside of the imaging FOV of the image sensor 110, but within the imaging/ranging FOV of the depth sensor 120). In other embodiments, the image sensor 110 and/or the illumination devices that are associated with the image sensor 110 can be deactivated in the intermediate power mode of operation. For embodiments in which the one or more processors 140 includes the processors 140A-C, at least one of the processors 140A-C can be activated (e.g., in a wake mode) in the intermediate power mode of operation. Other components of the imaging system 100 can be deactivated in the intermediate power mode of operation. As an example, the I/O interface 160, the one or more of the I/O device 162, and/or the communication interface 180 can be deactivated in the intermediate power mode of operation. Alternatively, the I/O interface 160, the one or more of the I/O device 162, and/or the communication interface 180 can be activated in the intermediate power mode of operation.

The imaging system 100 can transition between the operation modes based on the distance information output from the depth sensor 120 and/or the object information that is generated from the distance information. The imaging system 100 can transition between the modes of operation based on whether the distance information and/or object information satisfies specified criterion. As an example, in response satisfaction of a first criteria or criterion, the imaging system 100 can transition from a first, second, or third mode of operation to a different one of the first, second, or third mode of operation. As another example, in response satisfaction of a first criteria or criterion, the imaging system 100 can transition from the first mode of operation to the second mode of operation, and in response to satisfaction of a second criteria or criterion, the imaging system can transition from the second mode of operation to the third mode of operation. As another example, in response to satisfaction of a third criteria or criterion, the imaging sensor can transition from the third mode of operation to the second mode of operation, and in response to satisfaction of a fourth criteria or criterion, the imaging system 100 can transition from the second mode of operation to the first mode of operation. In one example, the first mode operation can be the low power mode of operation, the second mode of operation can be the intermediate power mode of operation, and the third mode of operation can be the high-power mode of operation. In another example, the first mode of operation can be a mode of operation in which the image sensor 110, the illumination device(s) 130 associated with the image sensor 110, and/or one of the one or more processors 140 that processes images acquired by the image sensor 110 and/or decodes indicia in the images can be deactivated, the second mode of operation can be a mode of operation in which the image sensor 110 and/or the one of the one or more processors 140 that processes images acquired by the image sensor 110 and/or decodes indicia in the images can be activated, and the third mode of operation can be a mode of operation in which the image sensor 110, the illumination device(s) 130 associated with the image sensor 110, and/or one of the one or more processors 140 that processes images acquired by the image sensor 110 and/or decodes indicia in the images can be activated The specified criterion can include specified positions and/or orientations of the objects in three-dimensional space, specified distances and/or locations of the objects relative to a reference location in three-dimensional space, one or more specified characteristics of the objects (e.g., size and/or shape), a specified direction of movement of the object, and/or recognition of specific objects and/or features of objects. As a non-limiting example, the output of the depth sensor 120 can be used by the one or more processors 140 to detect whether a person is standing in proximity to the imaging FOV of the image sensor 110 or a scan zone associated with the image sensor 110. In response to such detections, the imaging system 100 can enter the second mode of operation from the first mode of operation when a person comes into range of the depth sensor 120, and can enter the third mode of operation when objects (other than the person) are presented for scanning by the image sensor 110 (e.g., when the depth sensor 120 detects objects in or proximate to a scan zone of the image sensor 110). As another non-limiting example, the output of the depth sensor 120 can be used by the one or more processors 140 to transition from the first mode of operation to the second or third mode of operation when the one or more processors 140 detect any object in a volume where a user normally stands/sits so that the presence of an object/person in a region where a user stands triggers the transition between the modes of operation. As another non-limiting example, the output of the depth sensor 120 can be used by the one or more processors 140 to determine whether a person is facing the image sensor 110 or just walking by the imaging or ranging FOV of the depth sensor 120 by recognizing the shapes and features of the person (e.g., the features of a face) and based on the determination can transition between the modes of operation. The specified criteria or criterion can be specified by a user to configure a response of the imaging system 100 to the distance information and/or object information.

The distance information and/or object information can also be used by the one or more processors 140 to determine how to control the one or more components of the imaging system in the various modes of operation or as alternative to the various modes of operation based on the specified criteria or criterion. For example, the imaging system 100 can be configured to control one or more components of the imaging system differently within one or more of the modes of operation based on whether the specified criteria or criterion is satisfied. As a non-limiting example, the output of the depth sensor 120 can be used by the one or more processors 140 to detect and determine if a person is approaching the imaging FOV or a scan zone of the image sensor 110 with a bag, cart, basket, the imaging system 100-1 can output a signal via the I/O interface 160 and/or communication interface 180 that causes a video system to transition from a the video system's first mode of operation to the video system's second mode of operation to acquire and stream video of the environment, and if a further output of the depth sensor 120 is indicative of the person walking by with the bag, cart, or basket without stopping at a point-of-sale system associated with the imaging system to pay for the objects in the bag, cart, or basket, the imaging system 100 can communicate with the point-of-sale system to trigger an alert indicating that the person may not have paid for the objects in the bag, cart, or basket, where the alert can be transmitted to another device or system, such as a mobile device of an individual monitoring an exit of the facility within which the imaging system and point-of-sale system reside.

As another example, within the various modes of operation or independent of the various modes of operation, the imaging system 100 can be configured to respond to satisfaction of specified criteria or criterion, the one or more processor 140 can transition between the modes of operation to perform, enable, or activate one or more actions controlling the image sensor 110, the depth sensor 120, the illumination devices 130, the memory 150, the I/O interfaces 160, the I/O devices 162, and/or the communication interface 180. For example, in the different modes of operation, the imaging system can be configured to operate in an image sensor on mode (e.g., the image sensor 110 can acquire images), an image sensor off mode (e.g., the image sensor 110 cannot acquire images), an illumination device for imaging on mode (e.g., the illumination devices 130 associated with the image sensor 110 can output light), an illumination device off mode (e.g., the illumination devices 130 associated with the image sensor 110 cannot output light), an I/O interface on mode (e.g., the I/O interface 160 is enabled), an I/O interface off mode (e.g., the I/O interface 160 is disabled), an I/O device(s) on mode (e.g., the I/O device(s) 162 are enabled), an I/O device(s) off mode (e.g., the I/O device(s) 162 are disabled), a communication interface on mode (e.g., the communication interface 180 is enabled), a communication interface off mode (e.g., the communication interface 180 is disabled), and/or any other modes or combination of modes. The "on modes" can enable operation of the components and the "off modes" can disable operation of the components. In some embodiments, the "on" and "off" modes can be unavailable in one or more modes of operation. For example, in the first mode of operation the image sensor on mode, the illumination device on mode, the I/O interface on mode, the I/O device(s) on mode, and/or the communication interface on mode can be unavailable (e.g., the imaging system is configured so that one or more of these modes cannot be used). The imaging system 100 can be configured with the specified criteria or criterion to, for example, progressively activate more or different components of the imaging system 100 and/or may output signals to other devices or systems to progressively activate operations or functions of the other devices or systems based on the distance information and/or object information. For example, the imaging system 100 can detect a person at a far distance rolling a cart past (perhaps without paying) via the depth sensor 120 and the imaging system can transmit a signal to control an operation of a video capturing system to start analyzing video frames to determine if the person is leaving a store without paying. When a person gets closer as detected via the depth sensor 120, the imaging system 100 can enable or activate one or more of the I/O devices 162 and/or transmit a signal to a device to control a user interface associated with the device to let the person know that the imaging system 100 is available for use, and when an object is presented to be imaged as detected by the depth sensor 120, the imaging system 100 can activate the image sensor 110, the illumination devices 130 associated with the image sensor 110, and/or the processor 140B associated with the image sensor 110 to activate the imaging system 100 to illuminate the imaging FOV of the image sensor 110 via the illumination devices 130, acquire images via the image sensor 110, detect encoded indicia in the images, and decode the encoded indicia.

For embodiments in which the depth sensor 120 is employed using a three-dimensional camera, the depth sensor 120 can be used to identify a face of a user of the imaging system 100 and can log the user into the imaging system 100 or a device that is in communication with the imaging system 100 (e.g., such as a point-of-sale (POS) system) to allow the user to use the imaging system 100 and/or the device with an account of the user. Users can opt in to allow the imaging system and/or device to use the facial features of the user in this manner and/or can comply with privacy and/or consumer rights laws. For embodiments in which the depth sensor is capable of discerning features of objects (e.g., human features), the imaging system 100 can implement measures to obfuscate and/or redact such features.

Figure 2:
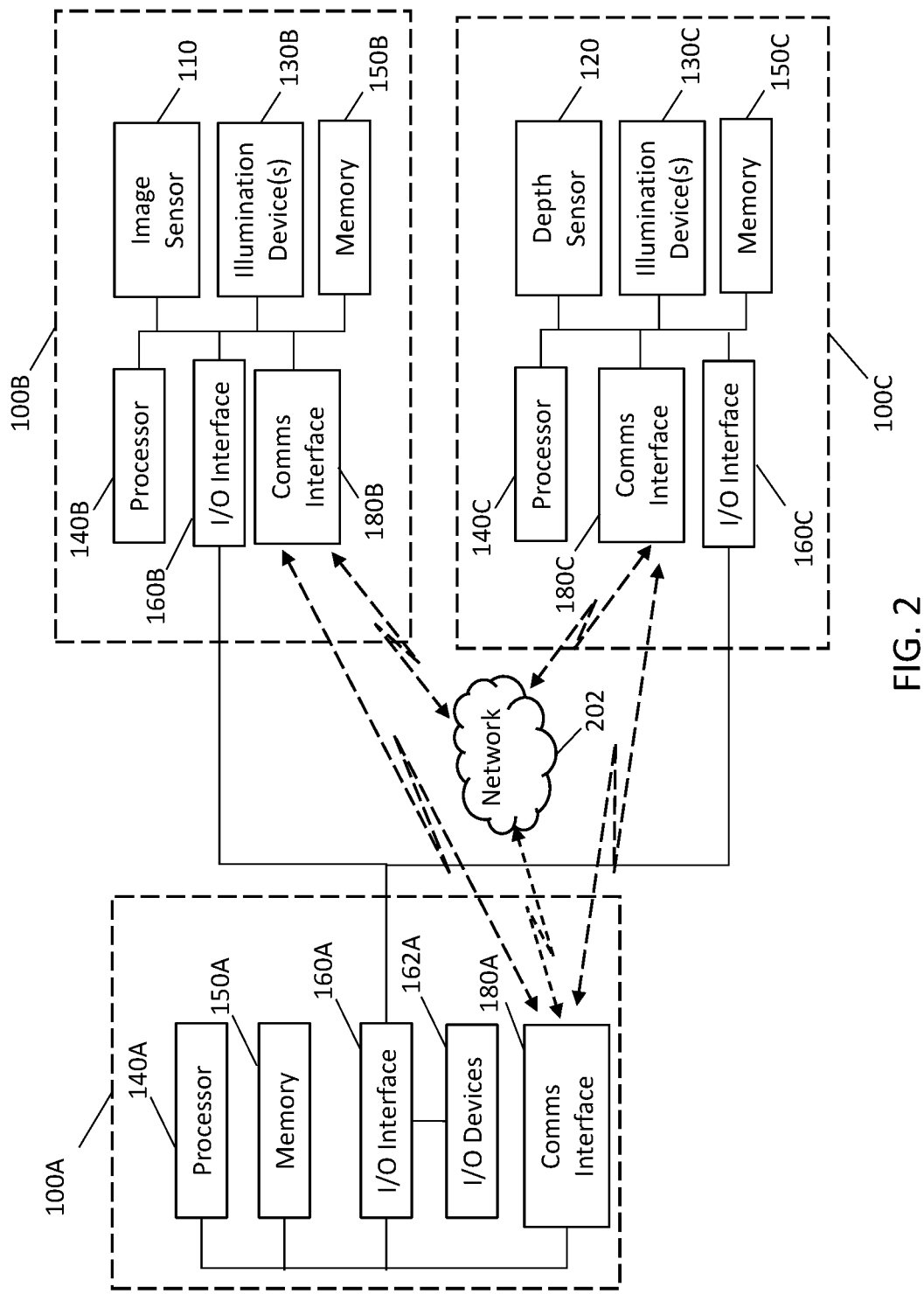
FIG. 2 is a block diagram that illustrates a distributed embodiment of the imaging system in accordance with embodiments of the present disclosure.

FIG. 2 is a block diagram that illustrates a distributed or modular embodiment of the imaging system 100 via the I/O interface and/or the communication interface in accordance with embodiments of the present disclosure. As an example, with reference to FIG. 2, the imaging system 100 can be distributed so that modules or electronic circuits 100A-C are indirectly (e.g., via network 202) or directly and/or wired or wirelessly communicatively coupled to each other via communication interfaces 180A-C and/or through I/O interfaces 160A-C. The circuits 100A-C together can perform the operations of an embodiment of the imaging system 100. Each of the modules or circuits 100A-C can be powered by a power supply (e.g., the power supply 190 shown in FIG. 1) and/or each of the modules or circuits 100A-C can be powered separate power supplies. The module or circuit 100A can include the processor 140A, memory 150A, I/O interface 160A, I/O devices 162A, and communication interface 180A. The module or circuit 100B can include the image sensor 110, illumination devices 130B, processor 140B, memory 150B, I/O interface 160B, and communication interface 180B. The module or circuit 100C can include the depth sensor 120, illumination devices 130C, processor 140C, memory 150C, I/O interface 160C, and communication interface 180C. The modules or circuits 100A-C together can perform the operations of the imaging system 100. The modules or circuits 100A-C can be integrated circuits, systems on a chip, components on circuit boards, and/or a combination thereof.

The circuit 100C can acquire reflected electromagnetic radiation from objects within the imaging or ranging FOV of the depth sensor 120, process distance information output from the depth sensor 120 via the processor 140C, and output the object information to the processor 140A (e.g., via the I/O interfaces 160C and 160A and/or the communication interface 180C and 180A). The electromagnetic radiation can be light having wavelengths in the non-visible light spectrum (ultraviolet, near infrared, and/or infrared spectrum) and the depth sensor 120 can have a sensitivity to wavelengths in the non-visible light spectrum (ultraviolet, near infrared, and/or infrared spectrum). The processor 140C controls illumination devices 130C to the emit the electromagnetic radiation in the non-visible light spectrum (ultraviolet, near infrared, and/or infrared spectrum) before and/or during an acquisition by the depth sensor 120 and can control an exposure of the depth sensor 120 to acquire reflected electromagnetic radiation from objects within the imaging or ranging FOV of the depth sensor 120. The depth sensor 120 can output distance information of objects in the imaging or ranging FOV of the depth sensor 120 to the processor 140C and the processor 140C can generate object information, which can include, for example, three-dimensional image data, positions and/or orientations of the objects in three-dimensional space, distances and/or locations of the objects relative to a reference location in three dimensional space, one or more characteristics of the objects (e.g., features, size, and/or shape), a direction of movement of the object, and/or can be used to recognize the objects and/or discriminate between the between the objects. As an example, the processor 140C can generate a wake or interrupt signal based on the object information that can be transmitted to the processor 140A, where the wake or interrupt signal causes the processor 140A to control an operation of the imaging system 100 to transition from one mode of operation to another mode of operation. For example, the processor 140C can be programmed to generate the signal upon satisfaction of specified criterion based on the object information. In one example, the components of the circuit 100C can be activated in each of the modes of operation of the imaging system.

The circuit 100B can acquire reflected visible light from objects within the imaging FOV of the image sensor 110, generate image data from the acquired light, and output images to the processor 140A (e.g., via the I/O interfaces 160B and 160A and/or the communication interface 180B and 180A). The light can have wavelengths in the visible light spectrum and the image sensor 110 can have a sensitivity to wavelengths in the visible light spectrum. The processor 140B controls illumination devices 130B to the emit visible light before and/or during an acquisition by the image sensor 110 and can control an exposure of the image sensor 110 to acquire reflected visible light from objects within the imaging FOV of the image sensor 110. An operation of the circuit 100B, including a power consumption of the circuit 100B can be controlled by the processor 140A based on a current mode of operation of the imaging system 100. As an example, when the imaging system 100 is in the first mode of operation (or the low power mode of operation), the circuit 100B can be controlled by the processor 140A, such that one or more components of the circuit 100B are deactivated. For example, the image sensor 110, the illumination device 130B, and/or the processor 140B can be deactivated such that the circuit 100B is incapable of acquiring and/or processing images. The processor 140B can additionally or alternatively have a sleep mode and a wake mode and the processor 140B can be in the sleep mode when the imaging system 100 is in the low power mode of operation. The circuit 100B can consume a low peak and/or average power. When the imaging system 100 include three modes of operation, for example, and is in the third mode of operation (or the high power mode of operation), the circuit 100B can be controlled by the processor 140A, such that the one or more components the circuit 100B that are deactivated in the first mode of operation are activated in the third mode of operation (or the high power mode of operation). For example, the image sensor 110, the illumination device 130B, and/or the processor 140B can be activated to acquire and process images. The processor 140B can additionally or alternatively transition to the wake mode and the processor 140B can be fully operational when the imaging system 100 is in the second or third mode of operation (or the high power mode of operation). The circuit 100B is capable of consuming a high peak and/or average power. When the imaging system 100 include three modes of operation, for example, the second mode of operation (or the intermediate power mode of operation), the circuit 100B can be controlled by the processor 140A, the circuit 100B can be controlled by the processor 140A, such that the circuit 100B is either capable or incapable of acquiring and/or processing images (e.g., detecting and decoding encoded indicia) based on whether specified mode criterion has been satisfied.

The circuit 100A can coordinate an operation of the imaging system and the circuits 100B and 100C and can facilitate communication with other devices or systems. As an example, a transition from the first mode of operation to the second and/or third mode of operation can cause the processor 140A to transition from a deactivated state (or sleep mode) to an activated mode (or a wake mode) in response to the wake signal from the processor 140C and/or can execute code or instructions stored in the memory 150A to transmit a wake or interrupt signal to the processor 140B of the circuit 140B so that the circuit 100B transition from a sleep mode to wake mode to enable the image sensor 110 to acquire images of the imaging FOV. The processor 140A can receive images from the processor 140B, detect and decode encoded indicia in the images, transmit (via the I/O interface 160A and/or communication interface 180A) information extracted from the encoded indica to other devices or systems, and can receive information or data from the other devices or systems. The processor 140A can also transmit wake, sleep, or interrupt signals to other devices or systems in response to signals received from the circuit 100C, where the wake, sleep, or interrupt signals can cause the other devices or systems to transition from one mode of operation to another mode of operation.

Figure 3:
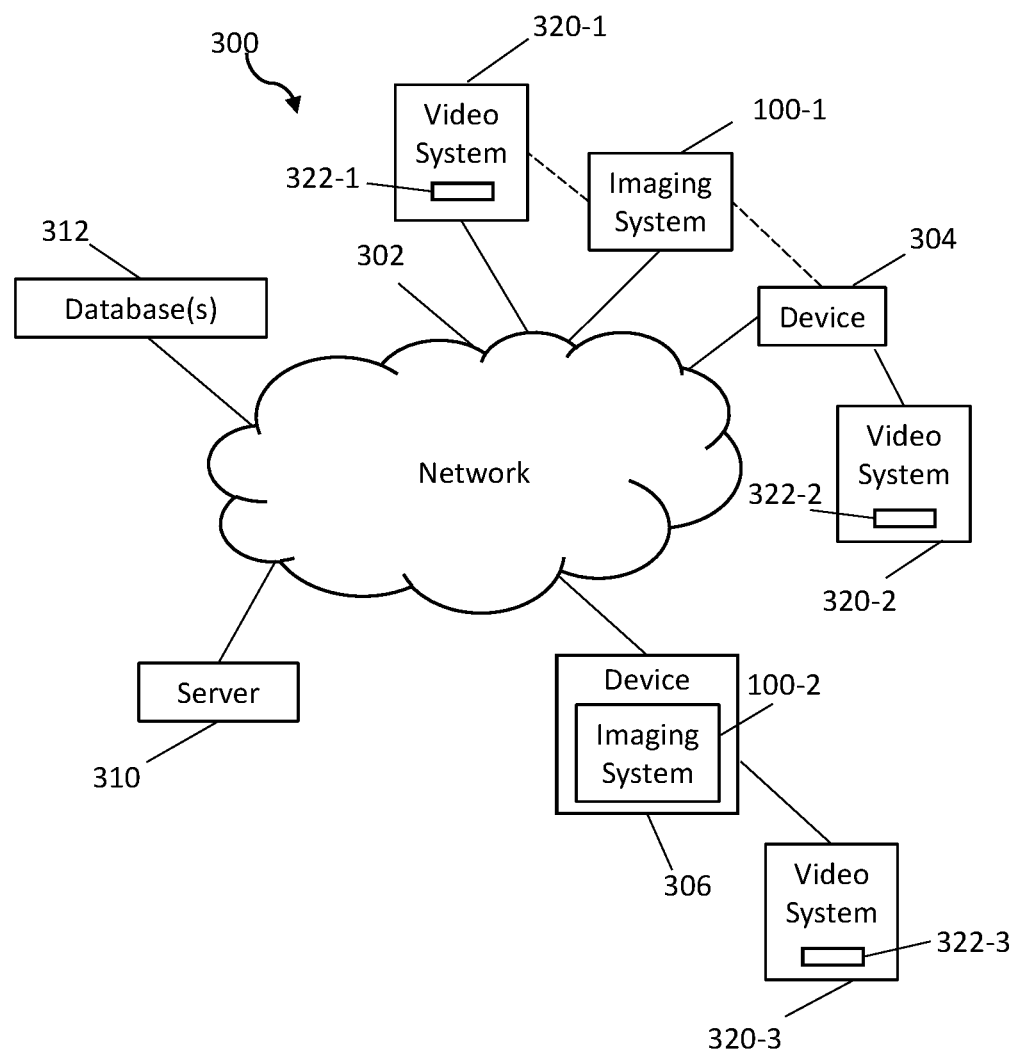
FIG. 3 is a block diagram of an example network environment including example embodiments of the imaging system in accordance with embodiments of the present disclosure.
Figure 6:
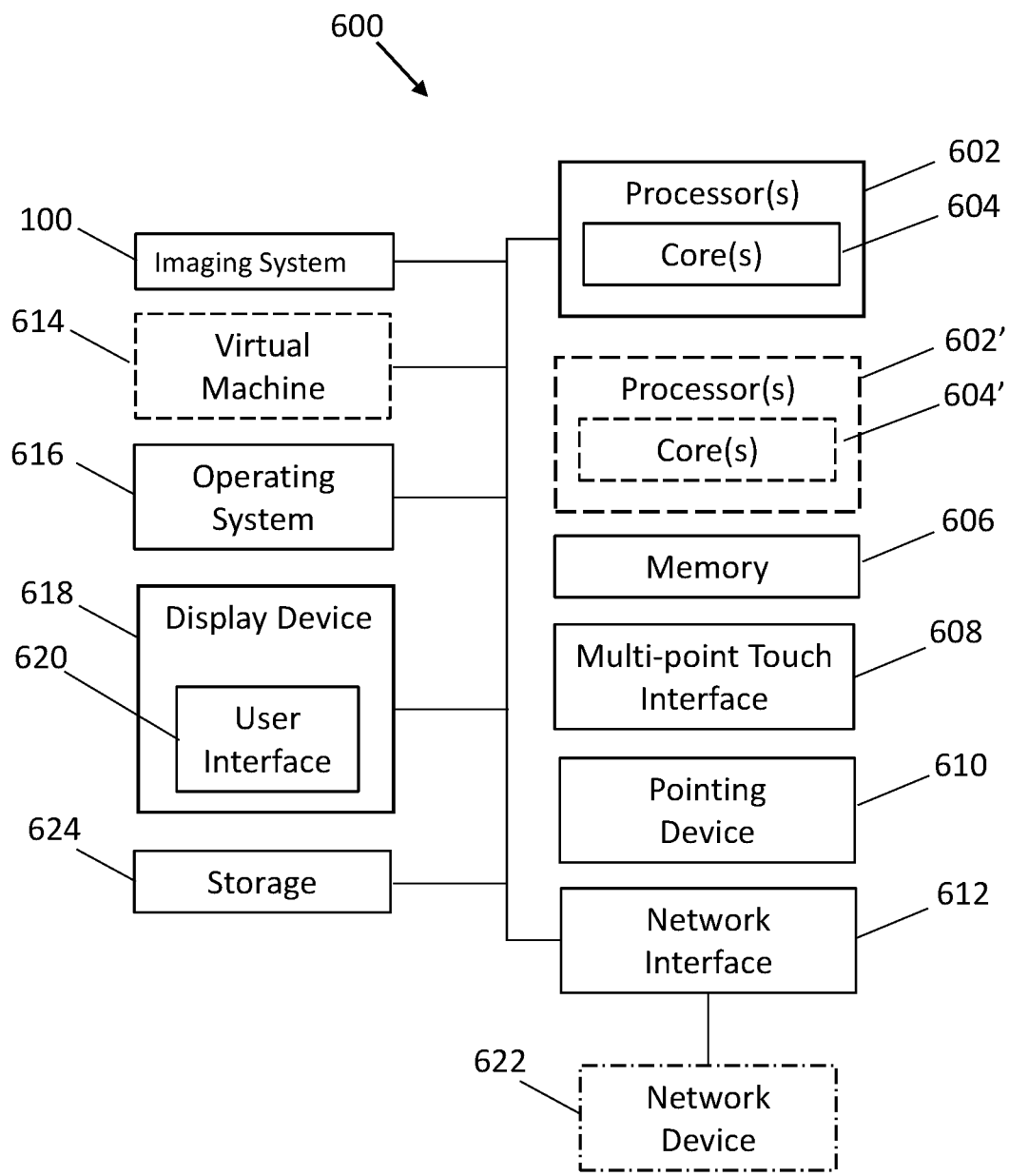
FIG. 6 is a block diagram of an example computing device in accordance with embodiments of the present disclosure.

FIG. 3 is an example network environment 300 in accordance with embodiments of the present disclosure. As shown in FIG. 3, the environment 300 can include embodiments of the imaging system 100 (individually denoted as imaging systems 100-1 and 100-2), devices 304-306, server 310, a database 312, and/or video systems 320-1 to 320-3, which can be operatively coupled to each other through a network 302. The server 310 can be computing device including a processor for executing instructions in accordance with embodiments of the present disclosure. The device 306 can be, for example, a base, a dock, a point-of-sale (POS) system, a server, and/or a client computing device. The video systems 320-1 to 320-3 can include a video capturing devices 322-1 to 322-3, respectively, that capture video of environment within which the video systems 320-1 to 320-3 reside. The video systems 320-1 to 320-3 can be used to monitor an area in the environment, e.g., for security, surveillance, safety, etc. The devices 304-306 can include a processor for executing instructions in accordance with embodiments of the present disclosure. An example computing device that can be implemented for the devices 304-306 and/or server 310 is illustrated in FIG. 6. The network 302 can be a communication or data network implemented as the Internet, an Intranet, virtual private network (VPN), wide area network (WAN), local area network (LAN), a cellular network, a mesh or ad-hoc network, and/or other suitable network.

The imaging systems 100-1 to 100-2, devices 304-306, and/or video systems 320-1 to 320-3 can communicate with the server 310 to request that the server 310 perform one or more operations. The server 310 can execute computer- or machine-readable instructions or code to perform operations and processes in response to the request and can transmit a response to the imaging systems 100-1 to 100-2, the devices 304-306, and/or video systems 320-1 to 320-3. The server 310 can store and/or retrieve information or data in the database 312 in response to information or data received by the server 310 (e.g., from the imaging systems 100-1 to 100-2, the devices 304-306, and/or video systems 320-1 to 320-3 and/or based on information or data generated by the server 310). The server 310 can implement enterprise service software that can include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

The imaging systems 100-1 and/or 100-2 can be implemented in the environment 300 to facilitate multi-device or multi-system wake-up and/or sleep function, facilitate imaging objects, facilitate detecting and/or decoding encoded indicia captured in images, and/or to facilitate detection of anomalies associated with objects passing through the imaging or ranging FOV of the depth sensors of the imaging systems 100-1 and 100-2. As one example, the imaging system 100-1 can be in direct communication (via wired or wireless connection) or indirect communication (e.g., via network 302) with the video system 320-1. As described herein the imaging system 100-1 can have different modes of operation (e.g., low, intermediate and high power modes of operation, illumination on/off mode of operation, image acquisitions, on/off mode of operation, image decoding on/off mode of operation, and/or other modes of operations) and can transition between the modes of operation based on distance information output from the depth sensor of the imaging system 100-1 and/or object information derived from the distance information by the imaging system 100-1. Additionally, or in the alternative, the video system 320-1 can have different modes of operation. As an example, the video system 320-1 can have an inactive mode of operation in which the video system 320-1 is incapable of acquiring video of the environment and/or incapable of storing and transmitting (or streaming) the video and an active mode in which the video system 320-1 is capable of acquiring video of the environment and capable of storing and/or transmitting (or streaming) the video of the environment (e.g., to the server 310).

The depth sensor (depth sensor 120 shown in FIG. 1) of the imaging system 100-1 can be used by the imaging system 100-1 to detect distance information associated objects (e.g., humans, packages, products, boxes, etc.) in the imaging/ranging FOV of the depth sensor 120 of the imaging system 100-1 and the imaging system 100-1 can determine object information from the distance information. The multi-distance information and/or object information can be used by the imaging system 100-1 to transition between the modes of operation of the imaging system 100-1 as described herein. Additionally, or in the alternative, the imaging system 100-1 can be programmed to transmit a wake up, sleep, or interrupt signal to the video system 320-1 causing the video system 320-1 to transition between its modes of operation. As an example, if the imaging system 100-1 determines object information associated with a first object within the imaging/ranging FOV of the depth sensor 120 satisfies a first criterion (e.g., the first object is within a first specified distance to a reference location and/or is moving in a direction towards a reference location), the imaging system 100-1 can transition from the first mode of operation to the second mode of operation to allow the imaging system 100-1 to transmit a signal to the video system 320-1 causing the video system 320-1 to transition from video system's inactive mode of operation to the video system's active mode of operation so that the video system acquires and/or transmits video to another device (e.g., the server 310). In the second mode of operation, the imaging system 100-1 can be incapable of acquiring images, detecting encoded indicia captured in images, and/or decoding the encoded indicia. If the depth sensor of the imaging system 100-1 detects distance information of the first object and/or a second object at a later time and determines object information from the distance information that satisfies a second criterion (e.g., the first object and/or second object is within a second specified distance to the reference location and/or is moving in a direction towards a reference location), the imaging system 100-1 can transition from the second mode of operation to the third mode of operation enabling the imaging system 100-1 to acquire images, detect encoded indicia captured in images, and/or decode the encoded indicia. Alternatively, the imaging system 100-1 can transition to the third mode of operation from the first mode of operation in response to satisfaction of the first criterion. If the imaging system 100-1 does not successfully acquire images including encoded indicia associated with the first, second, or other objects in the third mode of operation and the depth sensor of the imaging system 100-1 detects distance information of the first object and/or the second object at a further later time and determines object information from the distance information that satisfies a third criterion (e.g., the first object and/or second object is greater than a third specified distance to the reference location and/or the object information is indicative of the first and/or second object moving in a specified direction), the imaging system 100-1 can transmit an alert message to the server 310 and/or the device 304 indicating that an anomaly has occurred (e.g., encoded indicia associated with the first and/or second object was not imaged, detected, and/or decoded). As another example, if the imaging system 100-1 determines object information associated with objects within the imaging/ranging FOV of the depth sensor does not or no longer satisfies the first and/or second specified criterion, the imaging system 100-1 can transmit a signal to the video system 320-1 causing the video system 320-1 to transition from video system's active mode of operation to the video system's inactive mode of operation so that the video system incapable of acquiring and/or transmitting video to another device (e.g., the server 310) and the imaging system 100-1 can transition to the second mode of operation or the first mode of operation.

As another example, the imaging system 100-1 can be in communication (e.g., via network 302 or direct communication) with the device 304 and the device 304 can be in selective communication with the video system 320-1 and/or the video system 320-2. The device 304 can be a point-of-sale system that uses the imaging system 100-1 to scan and decode encoded indica on the objects. As described herein the imaging system 100-1 can have different modes of operation and can transition between the modes of operation based on distance information output from the depth sensor of the imaging system 100-1. Additionally, or in the alternative, the device 304, video system 320-1, and/or video system 320-2 can also have different modes of operation. As an example, the device 304 can have a first device mode of operation in which the device 304 is incapable of performing at least some operations or functions (e.g., receiving user input, rendering information on a display, transmitting information, such as information extracted from encoded indicia after it is decoded, and/or transmitting a wake signal) to other devices (e.g., the server 310 and/or video systems 320-1 and 320-2), a second device mode of operation in which the some of the functions that are disabled in the first device mode are enabled in the second device mode of operation (e.g., the device 304 can transmit a wake signal to the video systems 320-1 and/or 320-2, but can still be incapable receiving user input, rendering information on a display, transmitting information, such as information extracted from encoded indicia after it is decoded), and a third device mode of operation in which the device 304 of performing the operations or function that it is not capable of performing in the first and second device modes of operations. The video systems 320-1 and/or 320-2 can have an inactive mode of operation in which the video systems 320-1 and/or 320-2 are incapable of acquiring video of the environment and/or incapable of storing and transmitting (or streaming) the video and an active mode in which the video systems 320-1 and/or 320-2 are capable of acquiring video of the environment and capable of storing and transmitting (or streaming) the video of the environment (e.g., to the server 310).

The depth sensor of the imaging system 100-1 can be used by the imaging system 100-1 to detect distance information associated objects (e.g., humans, packages, products, boxes, etc.) in the imaging/ranging FOV of the depth sensor of the imaging system 100-1 and the imaging system 100-1 can determine object information from the distance information. The distance information and/or the object information can be used by the imaging system 100-1 to transition between the modes of the imaging system as described herein. Additionally, or in the alternative, the imaging system 100-1 can be programmed to transmit a wake up, sleep, or interrupt signal to the device 304 causing the device 304 to transition between its modes of operation. As an example, if the imaging system 100-1 determines object information associated with objects within the imaging/ranging FOV of the depth sensor satisfies a first criterion, the imaging system 100-1 can transition from the first mode of operation to the second mode of operation to allow the imaging system 100-1 to transmit a signal to the device 304 causing the device 304 to transition from device's first device mode of operation to the device's second device mode of operation. In response to transitioning to the device's second device mode of operation, the device 304 can transmit a signal to the video systems 320-1 and/or 320-2 so that the video systems 320-1 and/or 320-2 transition from the video system's inactive mode of operation to the video system's active mode of operation to enable the video system 320-1 and/or video system 320-2 to acquire and/or transmit video to another device (e.g., the device 304 and/or the server 310). In the imaging system's second mode of operation, the imaging system 100-1 can be incapable of acquiring images, detecting encoded indicia captured in images, and/or decoding the encoded indicia. If the depth sensor of the imaging system 100-1 detects distance information of the object at a later time and determines object information from the distance information that satisfies a second criterion (e.g., the object is within a second specified distance to the reference location), the imaging system 100-1 can send a signal to the device 304 causing the device 304 to transition from the device's second device mode of operation to the device's third device mode of operation. In response to satisfying the second specified criterion, the imaging system 100-1 can transition from the second mode of operation to the third mode of operation enabling the imaging system 100-1 to acquire images, detect encoded indicia captured in images, and/or decode the encoded indicia. Alternatively, the imaging system 100-1 and/or the device 304 can transition to their respective third modes of operation from the first mode of operation in response to satisfaction of the first criterion. If the imaging system 100-1 does not successfully acquire images including encoded indicia associated with the first, second, or other objects in the third mode of operation and the depth sensor of the imaging system 100-1 detects distance information of the first object and/or the second object at a further later time and determines object information from the distance information that satisfies a third criterion (e.g., the first object and/or second object is greater than a third specified distance to the reference location and/or the object information is indicative of the first and/or second object moving in a specified direction), the imaging system 100-1 can transmit an alert message to the server 310 and/or the device 304 indicating that an anomaly has occurred (e.g., encoded indicia associated with the first and/or second object was not imaged, detected, and/or decoded). As another example, if the imaging system 100-1 determines object information associated with objects within the imaging/ranging FOV of the depth sensor does not satisfy or no longer satisfies the first and/or second specified criterion, the imaging system 100-1 can transmit a signal to the device 304 causing the device 304 to send a signal to the video systems 320-1 and/or 320-2 to transition the video systems 320-1 and/or 320-2 to the inactive mode of operation and also cause the device 304 to transition from device's third device mode of operation to the device's first or second device mode of operation. In response to not satisfying or no longer satisfying the first and/or second criterion, the imaging system 100-1 can also transition to the imaging system's first or second mode of operation.

As another example, the imaging system 100-2 can be integrated with the device 306 and the device 306 can be in selective communication with the video system 320-1 and/or 320-3. The device 306 can be a point-of-sale system that uses the imaging system 100-2 to scan and decode encoded indica on the objects. As described herein the imaging system 100-2 can have different modes of operation and can transition between the modes of operation based on distance information output from the depth sensor of the imaging system 100-2. Additionally, or in the alternative, the device 306, video system 320-1, and/or video system 320-3 can also have different modes of operation. As an example, the device 306 can have a first device mode of operation in which the device 306 is incapable of performing at least some operations or functions (e.g., receiving user input, rendering information on a display, transmitting information, such as information extracted from encoded indicia after it is decoded, and/or transmitting a signal) to other devices (e.g., the server 310 and/or video systems 320-1 and/or 320-3), a second device mode of operation in which the some of the functions that are disabled in the first device mode are enabled in the second device mode of operation (e.g., the device 306 can transmit a wake signal to the video systems 320-1 and/or 320-3, but can still be incapable receiving user input, rendering information on a display, transmitting information, such as information extracted from encoded indicia after it is decoded), and a third device mode of operation in which the device 306 is capable of performing the operations or function that it is not capable of performing in the first and second device modes of operations. The video systems 320-1 and/or 320-3 can have an inactive mode of operation in which the video systems 320-1 and/or 320-3 are incapable of acquiring video of the environment and/or incapable of storing and transmitting (or streaming) the video and an active mode in which the video systems 320-1 and/or 320-3 are capable of acquiring video of the environment and capable of storing and transmitting (or streaming) the video of the environment (e.g., to the server 310).

The depth sensor (depth sensor 120 shown in FIG. 1) of the imaging system 100-2 can be used by the imaging system 100-2 to detect distance information associated objects (e.g., humans, packages, products, boxes, etc.) in the imaging/ranging FOV of the depth sensor of the imaging system 100-2 and the imaging system 100-2 can determine object information from the distance information. The distance information and/or the object information can be used by the imaging system 100-2 to transition between the modes of the imaging system 100-2 as described herein. Additionally, or in the alternative, the imaging system 100-2 can be programmed to transmit a signal to a processor of the device 306 causing the device 306 to transition between its modes of operation. As an example, if the imaging system 100-2 determines object information associated with a first object within the imaging/ranging FOV of the depth sensor satisfies a first specified criterion, the imaging system 100-2 can transition from the first mode of operation to the second mode of operation to allow to transmit a signal to the device 306 causing the device 306 to transition from device's first device mode of operation to the device's second device mode of operation. In response to transitioning to the device's second device mode of operation, the device 306 can transmit a signal to the video systems 320-1 and/or 320-3 so that the video systems 320-1 and/or 320-3 transition from the video system's inactive mode of operation to the video system's active mode of operation to enable the video system 320-1 and/or video system 320-3 to acquire and/or transmit video to another device (e.g., the device 304 and/or the server 310). In the imaging system's second mode of operation, the image sensor 110 can be incapable of acquiring images and/or the imaging system 100-2 can be incapable of detecting encoded indicia captured in images, and/or decoding the encoded indicia. If the depth sensor of the imaging system 100-1 detects further distance information of the first object and/or a second object at a later time and determines object information from the distance information that satisfies a second criterion (e.g., the first object and/or the second object is within a second specified distance to the reference location that is closer than the first distance), the imaging system 100-2 can send a second signal to the device 306 causing the device 306 to transition from the device's second device mode of operation to the device's third device mode of operation. In response to satisfying the second specified criterion, the imaging system 100-2 can transition from the second mode of operation to the third mode of operation enabling the imaging system 100-2 to acquire images, detect encoded indicia captured in images, decode the encoded indicia, and/or transmit information extracted from decoding the encoded indicia to another device (e.g., the server 310 and/or the device 304). Alternatively, the imaging system 100-2 and/or the device 306 can transition to their respective third modes of operation from their respective first modes of operation in response to satisfaction of the first criterion. If the imaging system 100-2 does not successfully acquire images including encoded indicia associated with the first, second, or other objects in the third mode of operation and the depth sensor of the imaging system 100-2 detects distance information of the first object and/or the second object at a further later time and determines object information from the distance information that satisfies a third criterion (e.g., the first object and/or second object is greater than a third specified distance to the reference location and/or the object information is indicative of the first and/or second object moving in a specified direction), the imaging system 100-2 can transmit an alert message to the processor of the device 306 and the device 306 can indicate an anomaly has occurred on a user interface of the device 306 and/or can transmit an alert message to the device 304 and/or the server 310 indicating an anomaly has occurred (e.g., encoded indicia associated with the first and/or second object was not imaged, detected, and/or decoded). As another example, if the imaging system 100-2 determines object information associated with first or second objects within the imaging/ranging FOV of the depth sensor does not satisfy or no longer satisfies the first and/or second specified criterion, the imaging system 100-2 can transmit a signal to the device 306 causing the device 306 to send a signal to the video systems 320-1 and/or 320-2 to transition the video systems 320-1 and/or 320-3 to the inactive mode of operation and also cause the device 306 to transition from device's third device mode of operation to the device's first or second device mode of operation. In response to not satisfying or no longer satisfying the first and/or second criterion, the imaging system 100-2 can also transition to the imaging system's first or second mode of operation. As another example, if the imaging system 100-2 determines object information associated with objects within the imaging/ranging FOV of the depth sensor does not satisfy the specified criterion, the imaging system 100-2 can transmit a signal to the device 306 causing the device to send a sleep signal to the video systems 320-1 and/or 320-3 to transition the video systems 320-1 and/or 320-3 to the inactive mode of operation and also cause the device 306 to transition from device's third device mode of operation to the device's first or second device mode of operation.

In addition, the object information generated based on the output of the depth sensor of the imaging systems 100-1 and/or 100-2 can be used to facilitate one or more other operations associated with the imaging system 100-1, the imaging system 100-2, the device 304, the device 306, the server 310, the video system 320-1, the video system 320-2, and/or the video system 320-3. As one example, the object information generated based on an output of the depth sensor can include information related to extracted facial features of a person and the imaging system 100-1, imaging system 100-2, the device 304, the device 306, and/or server 310 can use the extracted facial features as authentication criteria (e.g., matching the extracted facial features to stored facial features) for accessing an account associated with the person and/or for allowing the person to operate the imaging system 100-1, 100-2, the device 304, the device 306, the server 310, the video system 320-1, the video system 320-2, and/or the video system 320-3. As another example, the object information generated based on an output of the depth sensor can include information related to extracted item/product features of an object (e.g., size, shape, type) and the imaging system 100-1, imaging system 100-2, the device 304, the device 306, and/or server 310 can use the extracted object features to determine with the encoded indicia detected for the object corresponds to the present object imaged by the imaging system 100-1 and/or the imaging system 100-2, e.g., by matching the extracted object features to stored object features associated with the encoded indicia). In some embodiments, the object information can be used in combination with images acquired by the image sensors (image sensor 100 shown in FIG. 1) of the imaging systems 100-1 and 100-2 and/or video acquired by the video systems 320-1, 320-2, and/or 320-3 to identify and extract the object features of the object.

Figure 4B:
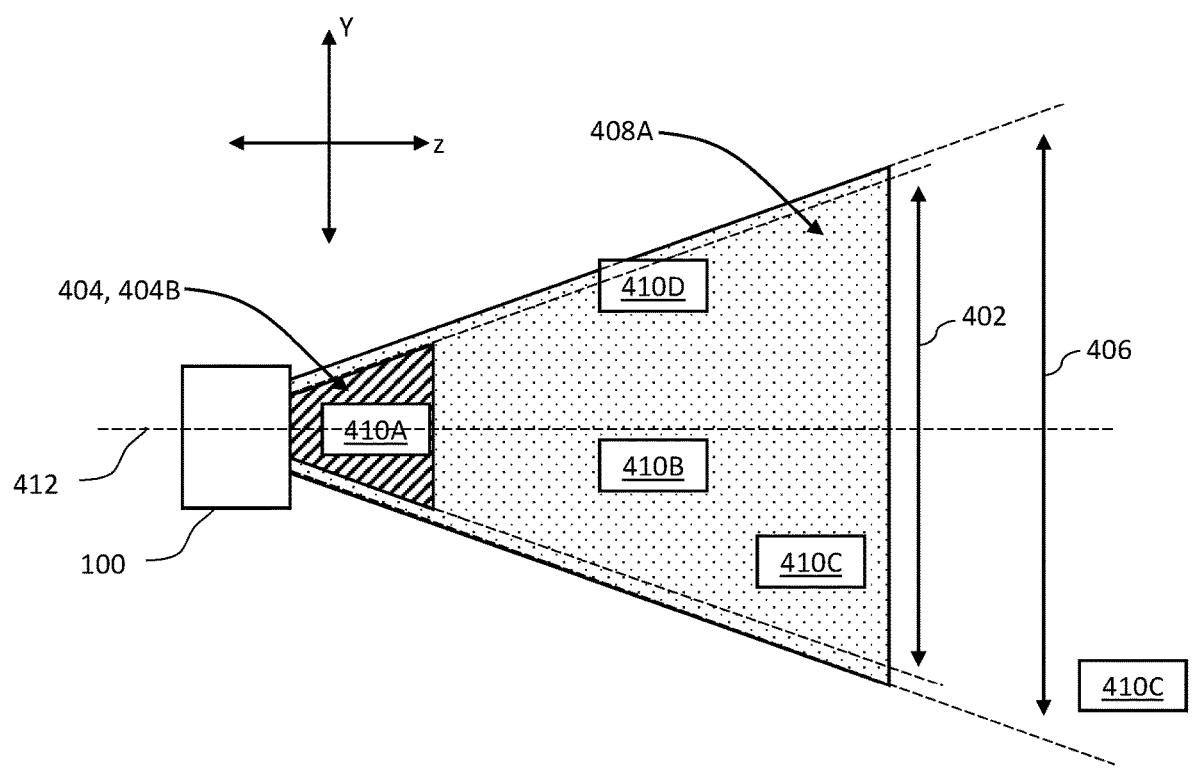

FIGS. 4A-E a schematic views of example field of views (FOVs) of the image sensor 110 and the depth sensor 120 of embodiments of the imaging system 100. Various widths, heights, and depths are described with reference to the x-axis, y-axis, and z-axis shown in FIGS. 4A-E. As shown in FIGS. 4A-B, the image sensor 110 of the imaging system 100 can have an imaging FOV 402, and the depth sensor 120 of the imaging system 100 can have an imaging/ranging FOV 406. The imaging FOV 402 and the imaging/ranging FOV 406 can correspond to a volume in three-dimensional space. The imaging/ranging FOV 406 can be larger or have a greater width (along the x-axis), length (along the z-axis), and/or height (along the y-axis) than the imaging FOV 402 such that the imaging FOV 402 is encompassed by the imaging/ranging FOV 406. In some embodiments, the imaging/ranging FOV 406 of the depth sensor 120 can be aligned with the imaging FOV 402 such that, for example, the widths and/or heights of the imaging/ranging FOV 406 and the imaging FOV 402 (e.g., measured along the x-axis and y-axis, respectively) are symmetrical about a midline 412. In some embodiments, the imaging/ranging FOV 406 of the depth sensor 120 can be aligned with the imaging FOV 402 such that, for example, the width of the imaging FOV 402 (e.g., measured along the x-axis) is symmetrical about a midline 412, while the width of the imaging/ranging FOV 406 (e.g., measured along the x-axis) is symmetrical about a midline 412 or vice versa. Skewing the imaging/ranging FOV 406 of the depth sensor 120 relative to the imaging FOV 402 of the image sensor 110 can allow the depth sensor 120 capture distance information on one side of the imaging FOV 402, which can be advantageous, for example, when objects are expect to arrive within the image FOV 402 from one side of the imaging FOV 402 (e.g., when objects are in a queue).

The image sensor 110 can have an associated scan zone 404 within the imaging FOV 402. When images are acquired that include an object within the scan zone 404, the imaging system 100 may successfully or reliably detect and/or decode encoded indicia on the object. When images are acquired that include an object outside of the scan zone 404, the imaging system 100 may unsuccessfully or unreliably detect and/or decode encoded indicia on the objects. As an example, object 410A is within the imaging FOV 402 and the scan zone 404 such that images acquired of the object 410A can facilitate detection and/or decoding of encoded indicia on the object 410A, while objects 410B-C are within the imaging FOV 402, but outside of the scan zone 404 such that images acquired of the objects 410B-C may not facilitate detection and/or decoding of encoded indicia on the objects 410B-C. Objects 410D-E are outside of the imaging FOV 402 are not included in images acquired by the imaging system 100. The ability of the imaging system 100 to detect and/or decode encoded indicia at different distances within the imaging FOV 402 may vary based on one of more factors including operating parameters of the image sensor 110 (e.g., exposure time, focal distance, sensor resolution, etc.) and the illumination device 130 (e.g., light intensity), environmental factors (e.g., ambient light) of the environment within which the image sensor 110 operates, and/or encoded indicia factors (e.g., a size of the encoded indicia), and as a result to scan zone 404 may also vary. The scan zone 404 can correspond to a range of distances from a window of the imaging system to a distance at which the image sensor 110 can successfully or reliably acquire and decode encoded indicia. The volume of the scan zone 404 can be static or dynamic for example based on the image acquisition parameters.

The imaging/ranging FOV 406 of the depth sensor 120 can define a volume within which the depth sensor 120 can acquire distance information associated with objects within the imaging/ranging FOV 406. The objects can be animate object (e.g., humans, animals, etc.) inanimate objects (e.g., products, packages, boxes, etc.), or other objects. As an example, the objects 410A-E are within the imaging/ranging FOV 406 of the depth sensor 120. Any objects that are outside of the imaging/ranging FOV 406 of the depth sensor 120 would not be detected by the depth sensor 120. When the objects 410A-E are within the imaging/ranging FOV 406 of the depth sensor 120, distance information associated with the objects 410A-E can be acquired by the depth sensor 120 and can be used to determine object information associated with the objects within the imaging/ranging FOV 406 of the depth sensor 120 (e.g., positions and/or orientations of the objects in three-dimensional space, distances and/or locations of the objects relative to a reference location in three dimensional space, one or more characteristics of the objects (e.g., size and/or shape), a direction of movement of the object, and/or can be used to recognize the objects and/or discriminate between the between the objects). The object information can be used to determine whether or not the imaging system 100 transitions from one mode of operation to another mode of operation. In one example, one or more activation zones 408A and/or 408B can be specified (e.g., the one or more processors 140 can be programmed to establish the activation zones 408A and/or 408B). The activation zones 408A and/or 408B can have a defined volume. In one example, the dimensions of the activation zones 408A and/or 408B can at least partially overlap, can be coextensive with, and/or can be greater than the scan zone 404. For example, for embodiments that include the activation zone 408A, the activation zone 408A can at least partially overlap, can be greater than, and/or can encompass the scan zone 404. For embodiments that include the activation zone 408B, the activation zone 408B can at least partially overlap and/or can be co-extensive with the scan zone 404. Embodiments of the imaging system 100 can specify the activation zone 408A, the activation zone 408B, or both activation zones 408A and 408B.

In an example operation, depending on where the objects 410A-E are located, the imaging system 100 (e.g., via the one or more processors 140) can determine whether to remain in a current mode of operation or to transition from one mode of operation to another mode of operation. As an example, the object 410C is outside of the activation zone 408A. In response to determining object information based on acquired distance information associated with the object 410C, the imaging system 100 can remain in the first mode of operation. As another example, in response to determining object information based on acquired distance data associated with the object 410D or 410E, which are within the activation zone 408A, the imaging system 100 can transition from the first mode of operation to a second mode of operation. As yet another example, in response to determining object information based on acquired distance data associated with the object 410A or 410B, the imaging system 100 can transition from a first mode of operation or a second mode of operation to the third mode of operation.

As another example, the first activation zone 408A can be specified such that when multi-distance information for an object (e.g., objects 410B, 410D, and/or 410E) is detected, the imaging system 100 can transition from the first mode of operation to the second mode of operation and the second activation zone 408B that at least partially overlaps and/or is coextensive with the scan zone 404 can be specified such that when multi-distance information for an object (e.g., object 410A) is detected, the imaging system 100 can transition from the first mode of operation or the second mode of operation to the third mode of operation. The image sensor 110 of the imaging system can be deactivated in the first and second mode of operation such that the image sensor 110 is incapable of acquiring images and can be activated in the third mode of operation such that the image sensor 110 is capable of acquiring images.

As another example, the first activation zone 408A can be specified such that when multi-distance information for an object (e.g., objects 410B, 410D, and/or 410E) is detected, the imaging system 100 can transition from the first or second mode of operation to the third mode of operation. In some examples, in the third mode of operation, the imaging system 100 can be configured to selectively enable and disable the ability of the imaging system to detect and/or decode encoded indicia. For example, for the position and distance of the object 410B relative to the scan zone 404 (e.g., the object 410B is in the activation zone 408A proximate to but outside of the scan zone 404), the imaging system 100 can be in the third mode of operation but can disable the detection or decoding of encoded indicia in any images acquired by the image sensor. The second activation zone 408B that at least partially overlaps and/or is coextensive with the scan zone 404 can be specified such that when multi-distance information for an object (e.g., object 410A) is detected in the scan zone 404, the imaging system 100 can be in the third mode of operation and can enable the detection or decoding of encoded indicia in any images acquired by the image sensor.

Figure 4C:
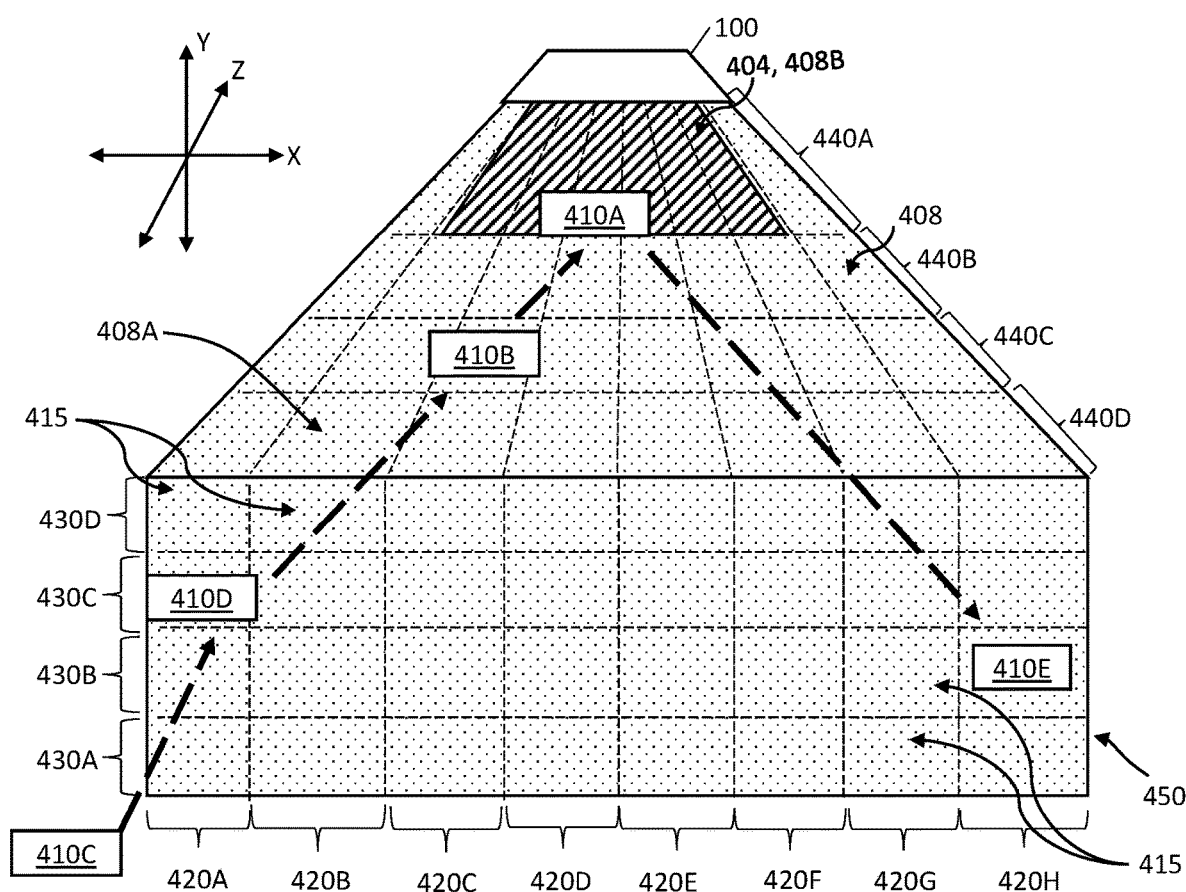
Figure 4D:
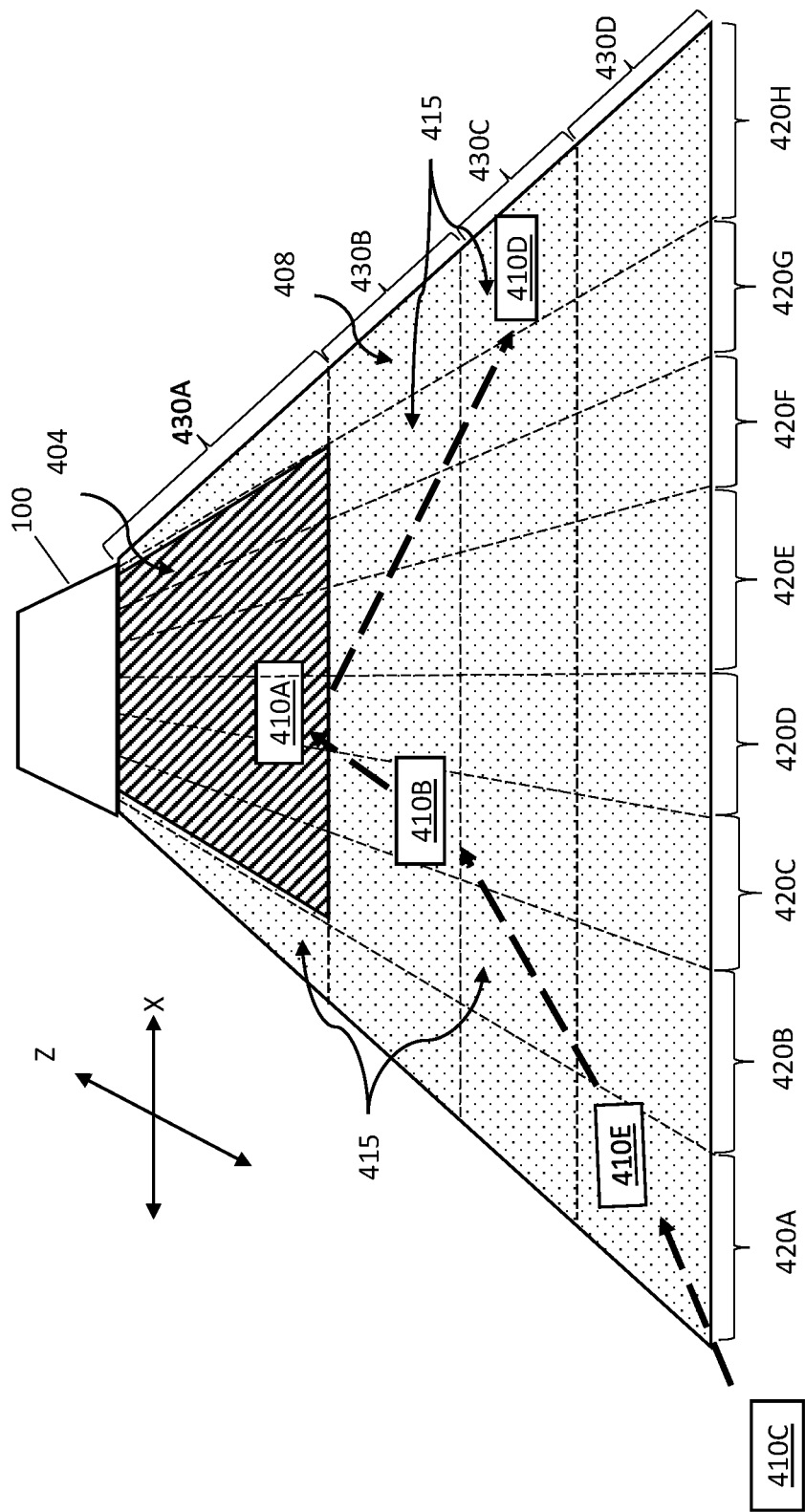
Figure 4E:
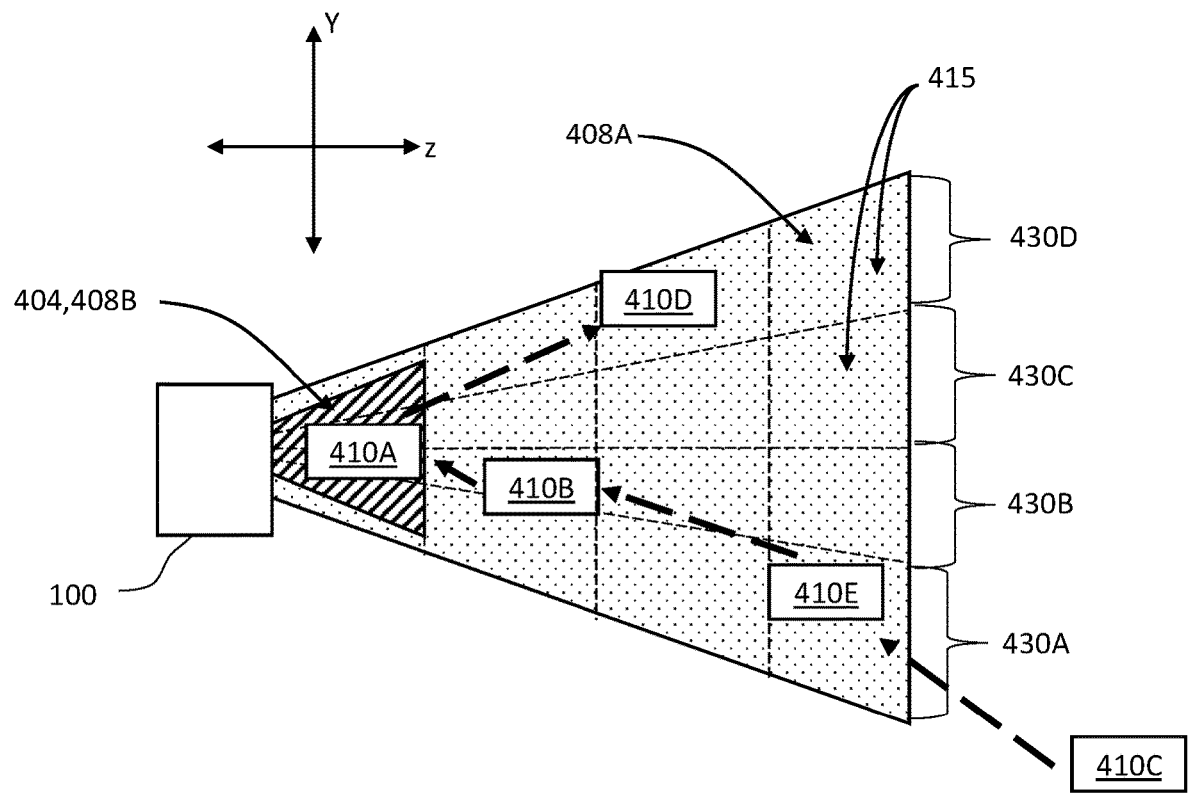

FIGS. 4C-E show simplified examples of a multi-zone implementation of the photosensitive cells of the depth sensor 120 which can segment the imaging/ranging FOV 406 of the depth sensor 120 into zones 415. The zones 415 can be defined by the photosensitive cells in the array of photosensitive cells, e.g., by assigning or segmenting the photosensitive cells in the array into the zones 415. The individual field-of-views (FOVs) for the zones 415 can be adjacent to each other and/or can overlap each other in three-dimensional space. Additionally, the zones 415 have been illustrated as being rectangular for simplicity, however the zones 415 can generally correspond to the individual field-of-view of the photosensitive cell or cells assigned to each zone 415 and may not be rectangular. Thus, while FIGS. 4C-E illustrate the FOVs of the zones 415 as being adjacent and non-overlapping for clarity, it will be understood by those skilled in the art that at the FOVs of adjacent zones 415 can overlap. Each zone 415 can be operable to detect and determine distances to objects in the respective zones. As an example, the imaging/ranging FOV 406 can be segmented into segments 420A-H, which may be referred to as horizontal segments (along the x-axis) based on orientation of FIGS. 4C-E, and/or segments 430A-D, which may be referred to as vertical segments (along the y-axis) based on orientation of FIGS. 4C-E. The horizontal segments 420A-H can segment the imaging/ranging FOV 406 across a width of the imaging FOV 406, such that the segments 420A-H define a one-dimensional segment horizontal array of zones 415 with respect to a plane 450 extending along the x-axis and the y-axis, and/or the vertical segments 430A-D can segment the imaging/ranging FOV 406 from a bottom to a top of the imaging/ranging FOV 406 as oriented in FIGS. 4C-E, such that the segments 430A-D define a one-dimensional vertical array of zones 415 with respect to the plane 450 extend along the x-axis and the y-axis. A combination of the segments 420A-H and 430A-D can segment the imaging/ranging FOV 406 into a two-dimensional array of zones 415 with respect to the plane 450. While an example of the 8×4 array or 32 zones has been illustrated in FIG. 4C, embodiments of the depth sensor can be segmented into a different number of zones. As an example, the depth sensor 120 segmented into a 8×1 or 1×8 array or 8 zones, a 4×1 or 1×4 array or 4 zones, a 3×3 array or 9 zones, a 3×6 or 6×3 array or 18 zones, a 4×4 array or 16 zones, a 4×8 or 8×4 array or 32 zones, an 8×8 array or 64 zones, and/or any number of zones 415. Different activation zones 440 can be specified along the z-axis within each of the zones 415 such that a determination can be made by the one or processors 140 of the imaging system 100 as to whether one or more of the objects 410A-E are in one of the specified activation zones 440. The activation zones 440 can be specified at different distances along the z-axis for different zones 415 and each zone can have the same or different number of activation zones 440. In the present example, activation zones 440A-D are illustrated at different distances along the z-axis.

The zones 415 and/or the activation zones 440 in the zones can be used by the one or more processors 140 of the imaging system 100 to detect and track multiple objects in the imaging/ranging FOV 406 of the depth sensor 120 of the imaging system 100. In an example operation, depending on where the objects 410A-E are located, the imaging system 100 (e.g., via the one or more processors 140) can determine whether to remain in a current mode of operation or to transition from one mode of operation to another mode of operation, whether to cause a device that is in communication with the imaging system 100 to remain in a current mode of operation or to transition from one mode of operation to another mode of operation, and/or whether an anomaly has occurred based on movement of one or more of the objects 410A-E. Thus, as described herein a determination of whether to transition from one mode of operation to another mode of operation can be based on criteria that includes one or a combination of attributes, parameters, and/or characteristics captured in the object information for objects that come into the imaging/ranging FOV of the depth sensor. Each zone 415 and/or activation zone 440 and/or the criteria for each zone 415 and/or activation zone 440 can be programmed and/or specified by a user (e.g., via the I/O interface 160 and/or I/O devices 162 or via the communication interface 180) and a response of the imaging system 100 to satisfaction of the criteria for a given one of the zones 415 and/or activation zones 440 can be specified by the user (e.g., via the I/O interface 160 and/or I/O devices 162 or via the communication interface 180). When the distance information and/or object information satisfies the specified criteria, the one or more processors 140 can be programmed to determine how to control the one or more components of the imaging system in the various modes of operation or independently of the various modes of operation. For example, the imaging system 100 can be configured to transition between the modes of operation and/or to control one or more components of the imaging system differently within one or more of the modes of operation based on whether the specified criteria or criterion is satisfied.

As an example, in response to determining object information based on acquired distance data associated with the object 410D or 410E in the zones 415 defined by segments 420A and/or 430C (and activation zone 440C) and segments 420H and/or 430B (and activation zone 440E), respectively, the imaging system 100 can remain in the first mode of operation for object 410D and can transition from the first mode of operation to the second mode of operation for object 410E (e.g., because object 410E is on a side (along the axis) from which objects are expected to arrive at the imaging FOV or scan zone 404 of the image sensor and object 410D is on a side (along the x-axis) from which objects are not expected to arrive at the imaging FOV or scan zone 404 of the image sensor). However, if the object 410D later moved towards the image sensor or scan zone 404 to activation zone 440B, the imaging system 100 can transition from the first mode of operation to the second or third mode of operation for object 410D. As yet another example, in response to determining object information based on acquired distance data associated with the object 410A or 410B in the zones 415 defined by segments 420D and segments 430A-B (and activation zone 440A) and segments 420C and segments of 430B (and activation zone 440B), respectively, the imaging system 100 can transition from a first mode of operation or the second mode of operation to the third mode of operation. The operation of the imaging system 100 in the third mode of operation can enable the acquisition of images of objects in the imaging FOV 402 and/or scan zone 404 of the image sensor and enable detection and decoding of encoded indicia captured in the images of the objects. In some examples, in the third mode of operation, the imaging system 100 is configured to selectively enable and disable the ability of the imaging system to detect and/or decode encoded indicia. For example, for the position and distance of the object 410B relative to the scan zone 404 (e.g., the object 410B is proximate to but outside of the scan zone 404), the imaging system 100 can be in the third mode of operation but can disable the detection or decoding of encoded indicia in any images acquired by the image sensor. In contrast, for the position and distance of the object 41A relative to the scan zone 404 (e.g., the object 410A is in the scan zone 404), the imaging system 100 can be in the third mode of operation and can enable the detection or decoding of encoded indicia in any images acquired by the image sensor.

As another example, within the various modes of operation or independent of the various modes of operation, the imaging system 100 can be configured to respond to satisfaction of specified criteria or criterion (e.g., object(s) detected in one or more of the specified activation zones 440), the one or more processor 140 can performed one or more actions to control the image sensor 110, the depth sensor 120, the illumination devices 130, the memory 150, the I/O interfaces 160, the I/O devices 162, and/or the communication interface 180 of the imaging system 100. For example, in the second and/or third modes of operation, the imaging system can be configured to operate in the image sensor on mode (e.g., the image sensor 110 can acquire images), the image sensor off mode (e.g., the image sensor 110 cannot acquire images), the illumination device for imaging on mode (e.g., the illumination devices 130 associated with the image sensor 110 can output light), the illumination device off mode (e.g., the illumination devices 130 associated with the image sensor 110 cannot output light), the I/O interface on mode (e.g., the I/O interface 160 is enabled), the I/O interface off mode (e.g., the I/O interface 160 is disabled), the I/O device(s) on mode (e.g., the I/O device(s) 162 are enabled), the I/O device(s) off mode (e.g., the I/O device(s) 162 are disabled), the communication interface on mode (e.g., the communication interface 180 is enabled), the communication interface off mode (e.g., the communication interface 180 is disabled), and/or any other modes or combination of modes. As described herein, the "on modes" can enable operation of the components and the "off modes" can disable operation of the components. In some embodiments, the "on" and "off" modes can be unavailable. For example, in the first mode of operation the image sensor on mode, the illumination device on mode, the I/O interface on mode, the I/O device(s) on mode, and/or the communication interface on mode can be unavailable (e.g., the imaging system is configured so that these modes cannot be used). The imaging system 100 can be configured with the specified criteria or criterion to, for example, progressively activate more or different components of the imaging system 100 based on within which of the zones 415 and/or activation zones 440 objects are detected and/or may output signals to other devices or systems to progressively activate operations or functions of the other devices or systems based on the distance information and/or object information. For example, the imaging system 100 can detect a person at a far distance rolling a cart past (perhaps without paying) via at least one of the zones 415 of the depth sensor 120 and the imaging system 100 can transmit a signal to control an operation of a video capturing system to start analyzing video frames to determine if the person is leaving a store without paying. When a person gets closer as detected via at least one of the zones 415 of the depth sensor 120, the imaging system 100 can turn on one or more of the I/O devices 162 and/or transmit a signal to a device to control a user interface associated with the device to let the person know that the imaging system 100 is available for use, and when an object is presented to be imaged as detected by at least one of the zones 415 of the depth sensor 120, the imaging system 100 can enable the image sensor 110, the illumination devices 130 associated with the image sensor 110, and/or the processor 140B associated with the image sensor 110 to enable the imaging system to illuminate the imaging FOV of the image sensor 110, acquire images via the image sensor 110, detect encoded indica in the images, and decode the encoded indicia.

As another example operation, the objects 410A-E illustrated in FIG. 4C-E can represent a single object travelling over time as illustrated by the dashed lines between the objects 410A-E. For example, the object 410C can represent the object at a first position at a first point in time. When the object is in the first position, the imaging system 100 can be in the first mode of operation. The object can travel to a second position at a second point of time illustrated by object 410D. When the object is in the second position at the second point in time, the imaging system 100 can determine the direction of movement of the object as being towards the scan zone 404 and that the object has entered the activation zone and the imaging system can transition from the first mode of operation to the second mode of operation or to the third mode of operation. The object can continue to move from the second position to a third position at a third point in time illustrated by object 410B. The imaging system 100 can continue to track the direction of movement of the object as moving towards the scan zone 404 of the image sensor 110. If the imaging system 100 is in the third mode of operation, the imaging system 100 can remain in the third mode of operation. If the imaging system 100 is in the second mode of operation, the imaging system 100 can remain in the second mode of operation or transition to the third mode of operation.

The object can continue to move from the third position to a fourth position at a fourth point in time illustrated by object 410A. The imaging system 100 can continue to track the direction of movement of the object towards the scan zone 404 and now in the scan zone 404. If the imaging system 100 is in the third mode of operation, the imaging system 100 can remain in the third mode of operation. If the imaging system 100 is in the second mode of operation, the imaging system 100 can transition to the third mode of operation as the object approaches the fourth position, which is in the scan zone 404 of the image sensor 110 of the imaging system 100.

The object can continue to move from the fourth position to a fifth position at a fifth point in time illustrated by object 410E. The imaging system 100 can continue to track the direction of movement of the object now moving away from the scan zone 404. The imaging system 100 can transition from the third mode of operation to the second mode of operation or the first mode of operation in response to the object moving away from the scan zone 404. The imaging system 100 can delay transitioning from the third mode of operation to the second or first mode of operation for a specified period of time as the direction of movement of the object is detected to be away from the scan zone 404. If the imaging system 100 transitions to the second mode of operation at the fifth position, the imaging system 100 can transition to the first mode of operation if the object continues to move away from the scan zone 404 and out of the activation zone 408.

Figure 5:
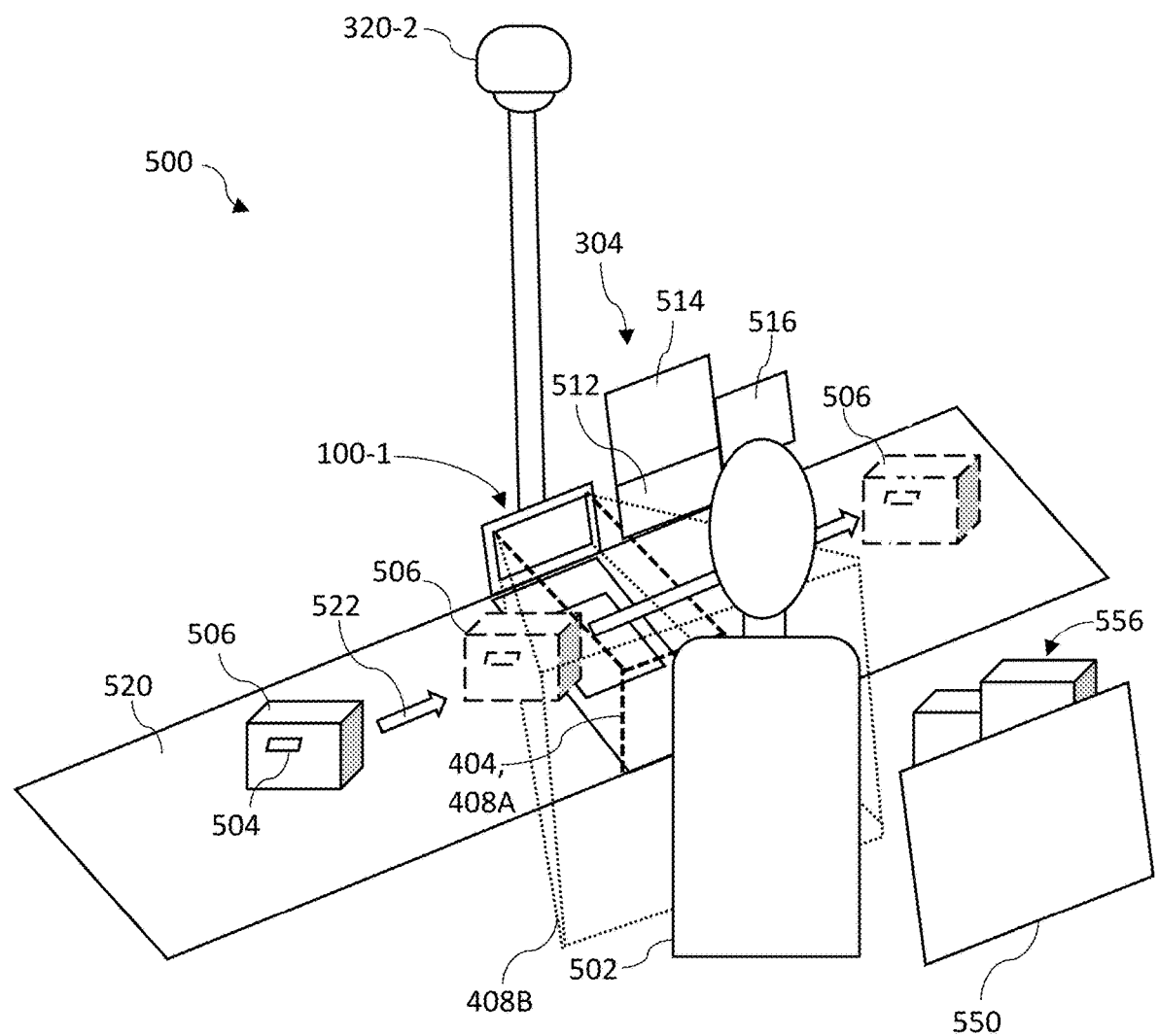
FIG. 5 is schematic diagram of an example point-of-sale station in accordance with embodiments of the present disclosure.

FIG. 5 is an example point-of-sale station 500 in accordance with embodiments of the present disclosure. The point-of-sale station 500 can include the imaging system 100-1, the device 304, the video system 320-2, and one or more conveyor belts 520. While the point-of-sale station 500 has been illustrated as including one or more conveyor belts 520, embodiments of the present disclosure may be devoid of the one or more conveyor belts 520. The device 304 can be embodied as a point-of-sale system that includes a computing device 512, a display device 514, and a user interface 516 (e.g., including a credit card reader). The imaging system 100-1 can be embodied as a bioptic scanner having the scan zone 404 (which can be above the platter of the bioptic scanner), the activation zone 408A, and/or the activation zone 408B. Additionally, the depth sensor 120 of the imaging system 100-1 can implement one or more zones (zones 415 shown in FIGS. 4C-E) each having their own specified activation zones (zones 440 shown in FIGS. 4C-e) as described herein. The components of the point-of-sale station (e.g., the imaging system 100-1, the device 304, and/or the video system 320-2) can operate as described herein, e.g., for example with reference to FIGS. 1-4.

In one example implementation, a user 502 can approach the point-of-sale station 500 to scan encoded indicia 504 on one or more objects 506 using the image sensor 110 of the imaging system 100-1. For embodiments that include the conveyor belts 520, the conveyor belt 520 can transport the one or more objects 506 in a direction indicated by arrow 522. The depth sensor (depth sensor 120) of the imaging system 100-1 can be used by the imaging system 100-1 to detect distance information associated the user 502 and/or the one or more objects 506 when the user and/or objects are within the imaging/ranging FOV of the depth sensor and the imaging system 100-1 (via the one or more processors 140) can determine object information associated with the user 502 and/or the one or more objects 506 from the distance information. The object information can be used by the imaging system 100-1 to transition between the modes of the imaging system as described herein. Additionally, or in the alternative, the imaging system 100-1 can be programmed to transmit a signal to the device 304 causing the device 304 to transition between its modes of operation or causing the device 304 to control an operation of another device in communication with the device 304. As an example, if the imaging system 100-1 determines object information associated with the user 502 and/or the one or more objects 506 within the imaging/ranging FOV of the depth sensor satisfies a first criterion (e.g., are within the activation zone 408A, are within a specified first distance relative to a reference location, are within a specified one or more of the activation zones 440 of one or more of the zones 415, are moving in the direction towards or generally parallel to the depth sensor, and/or any other criterion), the imaging system 100-1 can transition from the first mode of operation to the second mode of operation to allow the imaging system 100-1 to transmit a wake-up or interrupt signal to the device 304, which can cause the device 304 to transmit a wake-up or interrupt signal to the video systems 320-1 to enable the video system 320-1 and/or video system 320-2 to acquire and/or transmit video to another device (e.g., the device 304 and/or the server 310). In the imaging system's second mode of operation, the imaging system 100-1 can be incapable of acquiring images, detecting encoded indicia captured in images, and/or decoding the encoded indicia. If the depth sensor of the imaging system 100-1 detects distance information of the one or more objects 506 at a later time and determines object information from the distance information that satisfies a second criterion (e.g., are within the activation zone 408B, are within a specified second distance relative to a reference location, are within a specified one or more of the activation zones 440 of one of zones 415, are continuing to move in a direction towards or generally parallel to the depth sensor, and/or any other criterion), the imaging system 100-1 can send a second wake-up or interrupt signal to the device 304, which may cause the device 304 to perform one or more operations (e.g., such as enabling the display, card reader, a communication interface, etc.). In response to satisfying the second specified criterion, the imaging system 100-1 can transition from the second mode of operation to the third mode of operation enabling the image sensor to acquire images, detect encoded indicia captured in images, and/or decode the encoded indicia. Alternatively, the imaging system 100-1 and/or the device 304 can transition to their respective third modes of operation from their respective first modes of operation in response to satisfaction of the first criterion or the second criterion (e.g., the object detected is a human, or part of a human, that enters an activation zone within a specified distance of the imaging system or within a specified activation zone, such as activation zone 408A or one or more of the activation zones 440), the imaging system 100-1 can transition from the first mode of operation to the third mode of operation).

If the imaging system 100-1 does not successfully acquire images including encoded indicia associated with the first, second, or other objects in the third mode of operation and the depth sensor of the imaging system 100-1 detects distance information of the first object and/or the second object at a further later time and determines object information from the distance information that satisfies a third criterion (e.g., the one or more objects exit the activation zone 408B and/or 408A without the encoded indica being imaged and decoded, the one or more objects 506 are positioned at distance greater than a third specified distance relative to the reference location, the one or more objects 506 are moving in a specified direction, such as away from the scan zone 404, the user 502 and the objects 506 do not stop at the point-of-sale station 500, and/or any other criterion), the imaging system 100-1 can transmit an alert message to the device 304 indicating that an anomaly has occurred (e.g., encoded indicia associated with the first and/or second object was not imaged, detected, and/or decoded). As another non-limiting example, the output of the depth sensor 120 can be used by the one or more processors 140 to detect if a person is approaching the imaging FOV or a scan zone of the imaging system 100-1 with a bag, cart, and/or basket (a bag, cart, and/or basket is denoted by 550 in FIG. 5) having objects 556, the imaging system 100-1 can output a wake or interrupt signal that causes the device 304 to activate the video system 320-2 to transition from a sleep mode to wake mode to acquire and stream video of the environment, and if a further output of the depth sensor 120 is indicative of the person walking by with the bag, cart, or basket 550 without stopping at a point-of-sale station 500 associated with the imaging system 100-1 to pay for the objects 556 in the bag, cart, or basket 550, the imaging system 100 can communicate with the device 304 to trigger an alert indicating that the person may not have paid for the objects in the bag, cart, or basket 550, where the alert can be transmitted to another device or system, such as a mobile device of an individual monitoring an exit of the facility within which the imaging system and point-of-sale system reside. As another example, if the imaging system 100-1 determines object information associated with the user 502 and/or the one or more objects 506 within the imaging/ranging FOV of the depth sensor does not satisfy or no longer satisfies the first and/or second specified criterion, the imaging system 100-1 after a specified time period (a time delay), the imaging system 100-1 can revert back to the second mode of operation or the first mode of operation and/or can transmit a sleep or interrupt signal to the device 304 causing the device 304 to deactivate the video systems 320-1.

While example imaging system configurations have been illustrated in FIGS. 1-5, one or more of the aspects, components, and/or functions illustrated in and/or described with reference to FIGS. 1-5 may be combined, divided, re-arranged, omitted, eliminated and/or implemented in any other way. Further, the example imaging system configurations illustrated in FIGS. 1-5 may include one or more aspects in addition to, or instead of, those illustrated in FIGS. 1-5, and/or may include more than one of any or all of the illustrated aspects.

FIG. 6 is a block diagram of an example computing device 600 in accordance with embodiments of the present disclosure. The computing device 600 can include or be in communication with embodiments the imaging system 100. The computing device 600 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 606 included in the computing device 600 may store computer-readable and computer-executable instructions or software for implementing exemplary embodiments of described herein. The computing device 600 also includes configurable and/or programmable processor 602 and associated core 604, and optionally, one or more additional configurable and/or programmable processor(s) 602' and associated core(s) 404' (for example, in the case of computer systems having multiple processors/cores), for executing computer-readable and computer-executable instructions or software stored in the memory 606 and other programs for controlling system hardware. Processor 602 and processor(s) 602' may each be a single core processor or multiple core (604 and 604') processor. The processors 602 and 602' can operate in a sleep mode and wake mode. In one example, the processors 602 and 602' can transition from the sleep mode to the wake mode or from a wake mode to a sleep mode in response to a signal from embodiments of the imaging system 100. The processors 602 and 602' can also control an operation of one or more other devices in response to the signal, e.g., enable or disable one or more components that are in communication with the computing device, such as a video system (e.g., video systems 320-1, 320-2, and/or 320-3) as described herein.

Memory 606 may include a computer system memory or random-access memory, such as DRAM, SRAM, EDO RAM, and the like. Memory 606 may include other types of memory as well, or combinations thereof.

A user may interact with the computing device 600 through a visual display device 618, such as a computer monitor, which may display one or more user interfaces 620 that may be provided in accordance with exemplary embodiments. The computing device 600 may include other I/O devices for receiving input from a user, for example, a keyboard or any suitable touch interface (e.g., keyboard) 608, a pointing device 610 (e.g., a mouse). The keyboard 608 and the pointing device 610 may be coupled to the visual display device 618. The computing device 600 may exclude I/O peripherals or may include other suitable conventional I/O peripherals.

The computing device 600 may also include one or more storage devices 624, such as a hard-drive, CD-ROM, or other computer readable media, for storing data and computer-readable instructions and/or software that implement exemplary embodiments of described herein.

The computing device 600 can include a network interface 612 configured to interface via one or more network devices 622 with one or more networks (e.g., network 520), such as the Internet, an Intranet, virtual private network (VPN), wide area network (WAN), local area network (LAN), a cellular network, a mesh or ad-hoc network, and/or other suitable communication network, or some combination of any or all of the above. The network interface 612 may include a built-in network adapter, network interface card, PCMCIA network card, card bus network adapter, wireless network adapter, USB network adapter, modem or any other device suitable for interfacing the computing device 600 to any type of network capable of communication and performing the operations described herein. Moreover, the computing device 600 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 600 may run any operating system 616, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 616 may be run in native mode or emulated mode. In an exemplary embodiment, the operating system 616 may be run on one or more cloud machine instances.

Figure 7A:
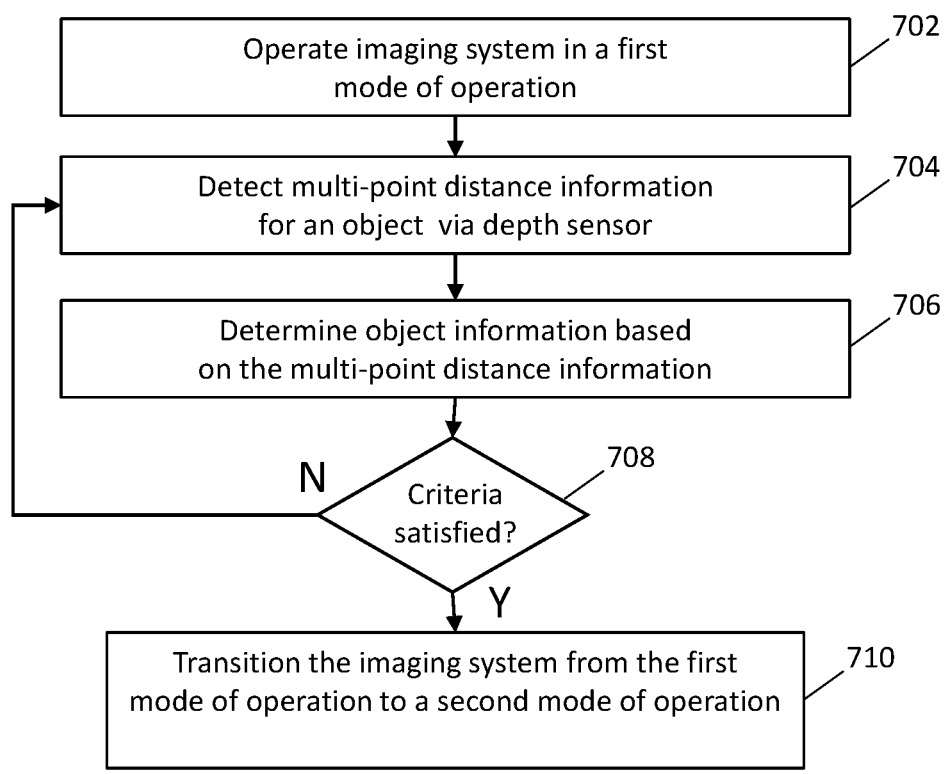
FIGS. 7A-B are flowcharts illustrating example processes implemented by embodiments of the present disclosure.

FIG. 7A is a flowchart illustrating an example process 700 implemented by embodiments of the present disclosure. At operation 702, an imaging system (e.g., imaging system 100) is operated in a first mode of operation in which the imaging system can consume a low amount of power. At least one of the image sensor (e.g., image sensor 110) or the illumination device(s) (a subset of the illumination devices 130) associated with the image sensor are deactivated and the depth sensor is activated in the first mode of operation. The field-of-view of the depth sensor (e.g., depth sensor 120) has a second field-of-view that at least partially overlaps, is co-extensive with, or is greater than the field-of-view of the image sensor. At operation 704, distance information an object is detected within the second field-of-view by the depth sensor of the imaging system. At operation 706, object information associated with the object is determined by at least one of the one or more processors (e.g., one or more processors 140) based on the distance information output of the depth sensor. The object information includes depth and position information of the object in three-dimensional space relative to a reference location. At operation 708, at least one of the one or more processors determines whether the object information associated with the object satisfies a specified first criteria. If not, the process can return to operation 704. If the first criteria is satisfied, the process proceed to operation 710, at which at least one of the one or more processors of the imaging system transitions the imaging system from the first mode of operation to a second mode of operation in response to the object information satisfying the specified first criteria, where the image sensor and/or the illumination device(s) associated with the image sensor can be activated in second mode of operation. The second mode of operation can consume more power than the first mode of operation. The at least one of the one or more processors of the imaging system can also transmit, via the at least one of the I/O interface (e.g., I/O interface 160) or the communication interface (e.g., communication interface 180), a signal from the imaging system to a device (e.g., a computing device or point-of-sale system 304) in response to transitioning from the first mode of operation to the second mode of operation to cause the device to at least one of transition from a first device mode of operation to a second device mode of operation or control a video system (e.g., video system 320-1, 320-2, 320-3) to acquire and transmit video to the device or a different device (e.g., server 310).

Figure 7B:
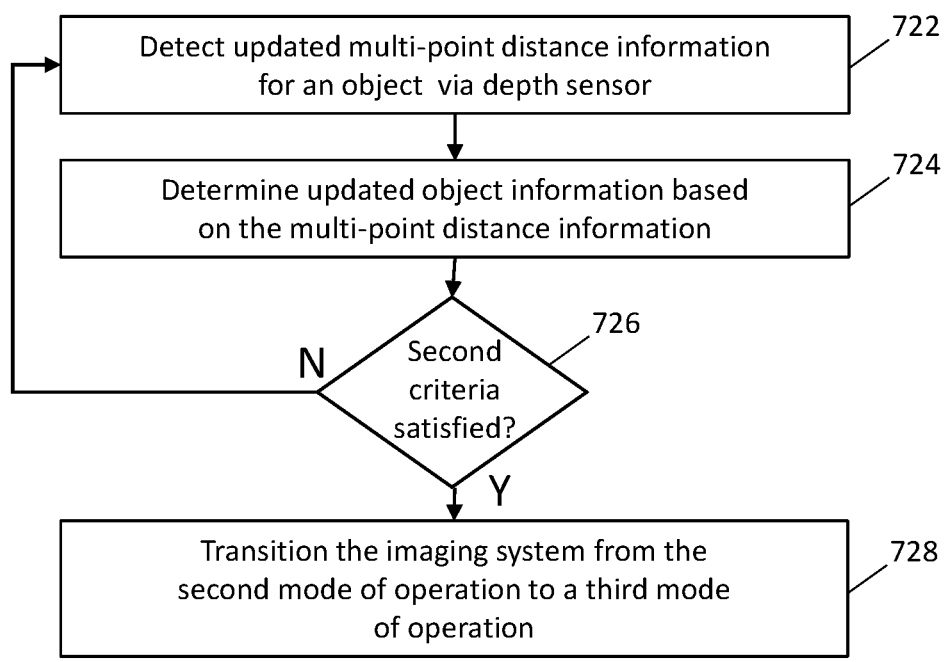

FIG. 7B is a flowchart illustrating an example process 720 implemented by embodiments of the present disclosure. The imaging system (e.g., imaging system 100) can be in the second mode of operation (for example as a result of FIG. 7A) and can include at least a third mode of operation. At operation 722, the at least of the one or more processors of the imaging system can repeatedly detect the object via the depth sensor to acquire updated distance information associated with the object. At operation 724, at least one of the one or more processors of the imaging system can determine updated object information associated with the object based on the updated distance information output of the depth sensor. At operation 726, at least one of the one or more processors can determine whether the updated object information associated with the object satisfies a specified second criteria. At operation 728, at least one of the one or more processors of the imaging system can transition the imaging system from the second mode of operation to the third mode of operation in response to the updated object information satisfying the second criteria. The image sensor and illumination device(s) can be activated in the third mode of operation. The imaging system can be capable of detecting and decoding encoded indicia in images of the object acquired by the image sensor in the third mode of operation. The at least one of the one or more processors of the imaging system can also transmit, via the at least one of the I/O interface or the communication interface, a signal from the imaging system to a device in response to transitioning to the third mode of operation to cause the device to at least one of transition from a first device mode of operation to a second device mode of operation and/or control a video system to acquire and transmit video to the device or a different device.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method comprising:
operating an imaging system in a first mode of operation in which at least one component of the imaging system is deactivated, the imaging system including an image sensor having a first field-of-view and a depth sensor having a second field-of-view that at least partially overlaps the first field-of-view;
detecting an object via the depth sensor of the imaging system within the second field-of-view, the depth sensor includes an array of photosensitive cells that acquires distance information for the object in the second field-of-view;
determining, via a processor of the imaging system, object information associated with the object based on the distance information output of the depth sensor, the object information includes depth and position information of the object in three-dimensional space relative to a reference location;
determining whether the object information associated with the object satisfies a specified first criteria; and
transitioning the imaging system from the first mode of operation to a second mode of operation in response to the object information satisfying the specified first criteria, the at least one component being activated in the second mode of operation.

2. The method of claim 1, wherein the imaging system includes at least one of an input/output (I/O) interface or a communication interface, and the method further comprising:
transmitting, via the at least one of the I/O interface or the communication interface, a signal from the imaging system to a device operatively coupled to the imaging system in response to the imaging system transitioning from the first mode of operation to the second mode of operation to cause the device to at least one of transition from a first device mode of operation to a second device mode of operation or control a video system to acquire and transmit video to the device or a different device.

3. The method of claim 1, wherein the second field-of-view extends beyond the first field-of-view on two or more sides of the first field-of-view and the imaging system transitions from the first mode of operation to the second mode of operation after the object enters the second field-of-view and before the object enters the first field-of-view.

4. The method of claim 1, wherein the imaging system includes at least one illumination device associated with the image sensor and a second processor configured to process images acquired by the image sensor, and
wherein at least one of the image sensor, the at least one illumination device, or the second processor is the at least one component that is deactivated in the first mode of operation.

5. The method claim 1, wherein the first mode of operation is a low power mode of operation and the second mode of operation is at least one of an intermediate power mode of operation or a high power mode of operation of the imaging system, the first mode of operation consumes less power than the second mode of operation.

6. The method of claim 5, wherein the second mode of operation is the intermediate power mode of operation and the method further comprises:
repeatedly detecting the object via the depth sensor to acquire updated distance information associated with the object;
determining, via the processor of the imaging system, updated object information associated with the object based on the updated distance information output of the depth sensor;
determining whether the updated object information associated with the object satisfies a specified second criteria; and
transitioning the imaging system from the intermediate power mode of operation to the high power mode of operation in response to the updated object information satisfying the second criteria, the high power mode of operation consuming more power than the intermediate power mode of operation and the first mode of operation.

7. The method of claim 1, further comprising:
activating detection and decoding encoded indicia in images of the object acquired by the image sensor in the second mode of operation,
wherein at least one of acquiring images, detecting encoded indicia in the images, or decoding the encoded indicia is deactivated in the first mode of operation.

8. The method of claim 1, further comprising:
repeatedly detecting the object via the depth sensor to acquire updated distance information associated with the object;
determining, via the processor of the imaging system, updated object information associated with the object based on the updated distance information output of the depth sensor;
determining whether the updated object information associated with the object satisfies a specified second criteria; and
transitioning the imaging system from the second mode of operation to a third mode of operation in response to the updated object information satisfying the second criteria,
wherein a scan zone is defined within the first field-of-view the image sensor, the first criteria corresponds to detecting the object positioned in a first activation zone defined within the second field-of-view, the first activation zone being adjacent to the scan zone and the second criteria corresponds to the object or a different object positioned in a second activation zone defined within the second field-of-view, the second activation zone at least partially overlapping the scan zone.

9. The method of claim 8, wherein determining the object information includes discriminating between animate and inanimate objects, and
wherein the object is an animate object and the different object is an inanimate object.

10. The method of claim 8, further comprising:
preventing the imaging system from decoding encoded indicia in images captured of the object when the object is positioned outside of the second activation zone.

11. The method of claim 6, further comprising:
transmitting a signal from the imaging system to a device in response to transitioning to the second mode of operation to cause the device to at least one of transition from a first device mode of operation to a second device mode of operation or control a video system to acquire and transmit video to the device or a different device.

12. The method of claim 1, wherein the object detected by the depth sensor is a human and the object information includes features of the human and the method further comprises:
determining a movement of the human through the second field-of-view and whether the human is transporting at least one of a bag, cart, or basket; and
determining whether the movement of the human with the at least one of the bag, cart, or basket corresponds to an anomaly; and
transmitting an alert from the imaging system to a device in response to determining the movement corresponds to an anomaly.

13. The method of claim 1, wherein the object detected by the depth sensor is determined to be a human and the object information includes facial features of the human and the method further comprises:
transmitting the facial features to a device to cause the device to allow or deny access to an account based on a comparison of the facial features to stored facial features.

14. The method of claim 1, wherein the object detected by the depth sensor is determined to be a human, the object information indicates that at least part of the human has entered an activation zone, and the first specified criteria is satisfied in response to determining the human has entered the activation zone.

15. The method of claim 1, wherein the array of photosensitive cells of the depth sensor is segmented into a plurality of zones and the method further comprises:
tracking a movement of the object through plurality of zones;
acquiring the distance information for the object based on the movement of the object through the plurality of zones,
wherein determining whether the object information satisfies the first criteria comprises determining whether a direction of the movement of the object through the plurality of zones corresponds to a specified direction of movement in the first criteria.

16. The method of claim 1, wherein the array of photosensitive cells of the depth sensor is segmented into a plurality of zones and the imaging system is configured to control one or more components of the imaging system differently based on within which of the plurality of zones the object is detected.

17. The method of claim 16, further comprising:
receiving input from a user to configure the imaging system to control one or more components of the imaging system differently based on within which of the plurality of zones the object is detected.

18. The method of claim 16, further comprising:
determining that the object is detected in one or more of the plurality of zones; and
controlling the one or more components of the imaging system based on the one or more of the plurality of zones within which the object is detected.

19. The method of claim 18, wherein the depth sensor tracks a movement of the object through the plurality of zones and the method further comprises:
activating or controlling different ones of the one or more components as the object moves through the plurality of zones.

20. A system comprising:
an image sensor that acquires images within a first field-of-view;
an illumination device configured to illuminate the first field-of-view at least one of before or during image acquisition by the image sensor;
a depth sensor including a plurality of photosensitive cells that acquires distance information within a second field-of-view, the second field-of-view at least partially overlapping the first field-of-view; and
at least one processor programmed to control an operation of the at least one processor, the image sensor, the illumination device, and the depth sensor based on a plurality of modes of operation, the plurality of modes of operation including a first mode of operation and a second mode of operation,
the at least one processor is programmed to transition from the first mode of operation to the second mode of operation in response to satisfaction of a specified first criteria based on object information associated with the distance information output by the depth sensor for an object within the second field-of-view,
at least one of image acquisition by the image sensor or illumination by the illumination device is deactivated in the first mode of operation and activated in the second mode of operation.

21. The system of claim 20, further comprising:
at least one of an input/output (I/O) interface or a communication interface,
wherein the at least one processor transmits, via the at least one of the I/O interface or the communication interface, a signal to a device in response to transitioning from the first mode of operation to the second mode of operation to cause the device to at least one of transition from a first device mode of operation to a second device mode of operation or control a video system to acquire and transmit video to the device or a different device.

22. The system of claim 20, wherein the second field-of-view extends beyond the first field-of-view on two or more sides of the first field-of-view and the at least one processor is programmed to transition from the first mode of operation to the second mode of operation after the object enters the second field-of-view and before the object enters the first field-of-view.

23. The system of claim 20, wherein the second mode of operation is at least one of an intermediate power mode of operation or a high power mode of operation.

24. The system of claim 23, wherein the second mode of operation is the intermediate power mode of operation and the at least one processor is programmed to:
transition from the intermediate power mode of operation to the high power mode of operation in response to satisfaction of a second criteria based on updated object information based on the updated distance information output of the depth sensor for the object, the high power mode of operation consuming more power than the intermediate power mode of operation and the first mode of operation.

25. The system of claim 20, wherein the at least one processor or a different processor is enabled to detect and decode encoded indicia in images of the object acquired by the image sensor in the second mode of operation and disabled from detecting encoded indicia in the images or decoding the encoded indicia in the first mode of operation.

26. The system of claim 20, wherein the at least one processor is programmed to transition from the first mode of operation to the second mode of operation in response to satisfaction of a second criteria based on updated object information based on the updated distance information output of the depth sensor for the object, and
wherein a scan zone is defined within the first field-of-view the image sensor, the first criteria corresponds to detecting the object positioned in a first activation zone defined within the second field-of-view, the first activation zone being adjacent to the scan zone and the second criteria corresponds to the object or a different object positioned in a second activation zone defined within the second field-of-view, the second activation zone at least partially overlapping the scan zone.

27. The system of claim 26, wherein the object information includes information for discriminating between animate and inanimate objects, and
wherein the object is an animate object and the different object is an inanimate object.

28. The system of claim 26, wherein the at least one processor or a different processor is prevented from decoding encoded indicia in images captured of the object when the object is positioned outside of the second activation zone.

29. The system of claim 23, wherein the at least one processor is programmed to:
transmit a signal to a device in response to transitioning to the second mode of operation to cause the device to at least one of transition from a first device mode of operation to a second device mode of operation or control a video system to acquire and transmit video to the device or a different device.

30. The system of claim 20, wherein the object is a human and the object information includes features of the human, and
the at least one processor or a different processor is programmed to:
determine a movement of the human through the second field-of-view and whether the human is transporting at least one of a bag, cart, or basket; and
determine whether the movement of the human with the at least one of the bag, cart, or basket corresponds to an anomaly; and
transmit an alert from the imaging system to a device in response to determining the movement corresponds to an anomaly.

31. The system of claim 20, wherein the object is a human and the object information includes facial features of the human, and the at least one processor is programmed to:
    transmit the facial features to a device to cause the device to allow or deny access to an account based on a comparison of the facial features to stored facial features.

32. The system of claim 20, wherein the array of photosensitive cells of the depth sensor is segmented into a plurality of zones, and
    the at least one processor or a different processor is programmed to:
        track a movement of the object through plurality of zones;
        acquire the distance information for the object based on the movement of the object through the plurality of zones, and
        determine whether the object information satisfies the specified criteria by determining whether a direction of the movement of the object through the plurality of zones corresponds to the specified direction of movement in the specified criteria.

33. A non-transitory computer-readable medium storing instructions that are executable by one or more processors, wherein execution of the instructions by the one or more processors cause the one or more processors to perform a process comprising:
    operating an imaging system in a first mode of operation in which at least one component of the imaging system is deactivated, the imaging system including an image sensor having a first field-of-view and a depth sensor having a second field-of-view that at least partially overlaps the first field-of-view;
    detecting an object via the depth sensor of the imaging system within the second field-of-view, the depth sensor includes an array of photosensitive cells that acquires distance information for the object in the second field-of-view;
    determining, via a processor of the imaging system, object information associated with the object based on the distance information output of the depth sensor, the object information includes depth and position information of the object in three-dimensional space relative to a reference location;
    determining whether the object information associated with the object satisfies a specified first criteria; and
    transitioning the imaging system from the first mode of operation to a second mode of operation in response to the object information satisfying the specified first criteria, the at least one component being activated in the second mode of operation.

* * * * *